US012149336B2

(12) United States Patent
Bellemare et al.

(10) Patent No.: US 12,149,336 B2
(45) Date of Patent: Nov. 19, 2024

(54) SYSTEM AND METHOD FOR REMOTELY CALIBRATING A PHASED ARRAY ANTENNA

(71) Applicant: MacDonald, Dettwiler and Associates Corporation, Sainte-Anne-de-Bellevue (CA)

(72) Inventors: Michel Bellemare, Beaconsfield (CA); Saeed Daneshmand, Montreal (CA); Guillaume Lamontagne, Saint-Eustache (CA)

(73) Assignee: MacDonald, Dettwiler and Associates Corporation, Saint-Anne-de-Bellevue (CA)

( * ) Notice: Subject to any disclaimer, the term of this patent is extended or adjusted under 35 U.S.C. 154(b) by 343 days.

(21) Appl. No.: 17/784,457

(22) PCT Filed: Dec. 10, 2020

(86) PCT No.: PCT/CA2020/051705
§ 371 (c)(1),
(2) Date: Jun. 10, 2022

(87) PCT Pub. No.: WO2021/113979
PCT Pub. Date: Jun. 17, 2021

(65) Prior Publication Data
US 2023/0006754 A1    Jan. 5, 2023

(51) Int. Cl.
*H04J 13/00*    (2011.01)
*H01Q 3/26*    (2006.01)
(Continued)

(52) U.S. Cl.
CPC ......... *H04J 13/0003* (2013.01); *H01Q 3/267* (2013.01); *H04B 1/707* (2013.01); *H04B 17/12* (2015.01); *H04J 13/0048* (2013.01)

(58) Field of Classification Search
CPC .. H04J 13/0003; H04J 13/0048; H01Q 3/267; H04B 1/707; H04B 17/12; H04B 17/104
See application file for complete search history.

(56) References Cited

U.S. PATENT DOCUMENTS

| 5,572,219 | A |   | 11/1996 | Silverstein et al. |
|---|---|---|---|---|
| 5,809,063 | A | * | 9/1998 | Ashe ...................... H04B 17/20 375/228 |

(Continued)

OTHER PUBLICATIONS

CIPO AS ISA, International Search Report and Written Opinion for PCT/CA2020/051705, Jan. 15, 2021.
(Continued)

*Primary Examiner* — Abdullahi Ahmed
(74) *Attorney, Agent, or Firm* — Own Innovation Inc.; Kent C. Howe; James W. Hinton

(57) ABSTRACT

Systems and methods for calibrating a phase array antenna ("PAA") are provided. The system includes a PAA having a plurality of array elements and a remote calibration terminal. The PAA is connected to a processor unit. The PAA includes a reference beamforming network ("BFN") for generating a reference beam and a calibration BFN for generating a calibration beam. The PAA applies a plurality of scrambled orthogonal codes to the calibration BFN to generate the calibration beam. The remote calibration terminal is configured to analyze the reference beam and the calibration beam to determine a calibration error for the PAA, the calibration error including a phase error and an amplitude error for each of the plurality of array elements of the PAA. The remote calibration terminal may be configured to measure a beam pointing error ("BPE") of the PAA and/or a coupling between array elements.

28 Claims, 10 Drawing Sheets

(51) Int. Cl.
*H04B 1/707* (2011.01)
*H04B 17/12* (2015.01)

(56) References Cited

U.S. PATENT DOCUMENTS

| | | | |
|---|---|---|---|
| 6,384,781 B1* | 5/2002 | Kautz | H01Q 3/267 |
| | | | 342/368 |
| 6,384,791 B1 | 5/2002 | Ikeda et al. | |
| 9,608,716 B1* | 3/2017 | Elwailly | H04B 17/40 |
| 10,270,524 B2* | 4/2019 | Burr | H01Q 3/267 |
| 2015/0341098 A1* | 11/2015 | Angeletti | H01Q 3/40 |
| | | | 375/267 |
| 2022/0209407 A1* | 6/2022 | Laria | H01Q 3/267 |
| 2022/0229154 A1* | 7/2022 | Chou | H01Q 3/38 |
| 2023/0029048 A1* | 1/2023 | Hahn, III | H04B 17/0085 |

OTHER PUBLICATIONS

Dong et al., "Calibration Method of Multi-beam Antenna Array Channel", IEEE, 2009 First International Conference on Information Science and Engineering, Nanjing, China, Dec. 26-28, 2009 (Dec. 28, 2009).

\* cited by examiner

SYSTEM AND METHOD FOR REMOTELY CALIBRATING A PHASED ARRAY ANTENNA

TECHNICAL FIELD

The following relates generally to phased array antennas, and more particularly to systems and methods for remotely calibrating a phased array antenna.

INTRODUCTION

Communications systems using phased array antennas ("PAA") have presently found applications in terrestrial and space systems. The flexibility and capability to point beams to moving users is a definite advantage for the 5G (5th Generation of cellular network) or Low-Earth Orbit ("LEO") satellite systems. The precision of the beam shape with its side lobes depends on the accuracy of the phase and amplitude of the Beamforming Network ("BFN"). When performed digitally, the initial accuracy is excellent but degrades with the variations found in the radio frequency ("RF") circuitry. When using analog beamforming, the BFN itself adds more variance and errors when forming a beam. The key point is the active array elements and its components need to be calibrated to ensure proper coherency of the array element weights applied.

There are two fundamental architectures used to calibrate a PAA. A first is on-board calibration which uses embedded sensors close to the array and local processing. A second is remote in-orbit calibration using a ground terminal. The first calibration approach (on-board) does not need a dedicated terminal but uses hardware and software resources in the spacecraft to perform the calibration tasks. The second calibration approach (remote calibration), by not requiring such on-board hardware and software resources, may advantageously lower the cost and complexity of the PAA and satellite payload.

Several methods have been developed over the years to solve the remote calibration problem. Work from Silverstein (e.g. U.S. Pat. No. 6,384,781 B1), Bast (e.g. PCT Publication No. WO 2005/086285 A1), and Oodo et al. (e.g. "A remote calibration for a transmitting array antenna by using synchronous orthogonal codes", IEICE Trans. Comm. Vol. E84-B, No. 7, 5 Jul. 2001) have paved the way in that regard, respectively. The method described by Silverstein lacks performance in terms of calibration error especially when tracking a moving target. Since the objective is to calibrate the phased array antenna remotely, the communications channel varying with time and conditions makes the tasks difficult and thus requires a strong algorithm to overcome the channel impairments.

Another challenge when sending calibration signals over the air is to prevent having hot spots or high radiated power density or Equivalent Isotropically Radiated Power ("EIRP") points in space and thus reduce interfering signals. This is particularly true for space systems under strict regulations, such as from the International Telecommunication Union ("ITU"), the Federal Communications Commission ("FCC"), or other regulatory commissions. Further, remote calibration approaches which calibrate a Single Element (SE) at a time suffer from Signal-to-Noise Ratio ("SNR"), thus taking more integration time and may be difficult to implement in hardware without RF switches in analog beamforming.

Some existing calibration systems use a separate antenna to send a reference signal. Such an approach can be more costly and use more volume and mass on the satellite.

Generally PAAs have several beams which this calibration method is taking advantage of.

Analog beamforming in multi-beam PAAs may take a long time to calibrate when the number of beams, B, and the number of array elements, N, are high. The number of RF beamformer adjustments to calibrate, being NxB, could be in the several thousands. Being able to calibrate the beams simultaneously can thus provide a great advantage. Digital beamforming in multi-beam generally has fewer RF paths to calibrate but can also benefit from this method.

Accordingly, there is a need for an improved system and method to calibrate a phased array antenna that overcomes at least some of the disadvantages of existing systems and methods.

SUMMARY

A system for calibrating a phased array antenna ("PAA") is provided. The system includes a PAA having a plurality of array elements, the PAA connected to a processor unit, and a remote calibration terminal. The PAA includes a reference beamforming network ("BFN") for generating a reference beam and a calibration BFN for generating a calibration beam. The PAA applies a plurality of scrambled orthogonal codes to the calibration BFN to generate the calibration beam. The remote calibration terminal is configured to analyze the reference beam and the calibration beam to determine a calibration error for the PAA, the calibration error including a phase error and an amplitude error for each of the plurality of array elements of the PAA.

The scrambled orthogonal codes may be applied to the calibration beam to spatially distribute radiated power and reduce peak radiated power levels.

The remote calibration terminal may be further configured to transmit the calibration error to the PAA for removal from each of the plurality of array elements.

The system may further include the processor unit. The calibration error may be provided to the processor unit and the processor unit removes the calibration error from the plurality of array elements.

The plurality of scrambled orthogonal codes may be distributed to each of the plurality array elements varying with time.

The scrambled orthogonal codes may be scrambled Hadamard codes.

The reference beam and the calibration beam may be synchronized.

The PAA may be a transmit PAA, and: the reference beam may include a reference signal component and the calibration beam may include a calibration signal component; the reference signal component and the calibration signal component may be sent to the reference BFN and calibration BFN, respectively, to generate the reference beam and the calibration beam; and the reference beam and the calibration beam may be radiated by the transmit PAA.

The PAA may be a receive PAA, and: the reference beam may include a reference signal component that is generated and transmitted by the remote calibration terminal to the PAA, and the PAA may use the reference signal component to generate the reference beam and the calibration beam using the reference BFN and the calibration BFN, respectively.

The reference beam may include a BFN component comprising a regular tracking beam.

The reference beam may include a reference signal component and the calibration beam may include a calibration signal component, wherein the reference signal component comprises a first spreading sequence and the calibration signal component comprises a second spreading sequence, the first and second spreading sequences being different.

The first and second spreading sequences may be a direct spread spectrum sequence ("DSSS").

The reference beam may include a reference signal component and the calibration beam may include a calibration signal component. The reference signal component and the calibration signal component may be modulated. The reference beam and the calibration beam may be coded with direct spread spectrum sequence ("DSSS") orthogonal codes.

The reference beam may include a reference signal component and the calibration beam may include a calibration signal component. The reference signal component and the calibration signal component may be modulated. The reference beam and the calibration beam may be coded with a direct spread spectrum sequence ("DSSS") code with repetition.

The reference beam and the calibration beam may be modulated, and the reference beam and calibration beam may be coded using a direct spread spectrum sequence ("DSSS").

The reference beam and the calibration beam may each comprise a beam pointing information. For the calibration beam, the beam pointing information may be mathematically multiplied by the plurality of scrambled orthogonal codes.

The beam pointing information may be defined as a steering vector.

The remote calibration terminal may be further configured to remove the beam pointing information from the calibration beam to determine the calibration error.

The system may further include the processor unit connected to the PAA, and the beam pointing information may be known by the processor unit or by an attitude control subsystem and the beam pointing information may be sent to the remote calibration terminal for removal.

The beam pointing information may be sent to the remote calibration terminal just prior to formal synchronization to start calibration.

The remote calibration terminal may be configured to perform coherent detection of the reference beam and the calibration beam using the same radio frequency ("RF") channel.

A single radio frequency ("RF") channel may be used for a reference RF channel and a calibration RF channel.

The system may further include the processor unit connected to the PAA, and the processor unit may be configured to pause normal payload transmission of the PAA during calibration such that the PAA during the calibration is dedicated solely to the calibration.

The PAA may be mounted on a moving platform.

The moving platform may be a spacecraft in an orbit.

The orbit may be a non-geosynchronous orbit.

The non-geosynchronous orbit may be one of a Medium Earth Orbit or a Low Earth Orbit.

The orbit may be such that the spacecraft is moving relative to a celestial body.

The PAA may be a multiple beam PAA.

The PAA and the remote calibration terminal may be configured to perform calibration of a plurality of beams of the multiple beam PAA.

The calibration of the plurality of beams may be performed simultaneously.

The remote calibration terminal may be a dedicated remote calibration terminal.

The remote calibration terminal may be a ground station.

The PAA may be a component of a space-based system.

The PAA may be component of a terrestrial-based system.

The plurality of array elements may be active simultaneously during calibration.

The processor unit connected to the PAA may be a satellite onboard processor configured to digitize communication signals.

The beam pointing information may comprise a plurality of predetermined beam forming coefficients.

A method of calibrating a phased array antenna ("PAA") is provided. The method includes generating a reference beam and a calibration beam at the PAA. The reference beam is generated using a reference beamforming network ("BFN") and the calibration beam is generated using a calibration BFN. The calibration beam is generated by applying a plurality of scrambled orthogonal codes to the calibration BFN. The method further includes analyzing the reference beam and the calibration beam at a remote calibration terminal to determine a calibration error for the PAA. The calibration error includes a phase error and an amplitude error for each of the plurality of array element of the PAA.

The scrambled orthogonal codes may be applied to the calibration beam to spatially distribute radiated power and reduce peak radiated power levels.

The method may further include transmitting calibration error from the remote calibration terminal to the PAA for removal from each of the plurality of array elements.

The method may further include providing the calibration error to a processor unit connected to the PAA and removing the calibration error from the plurality of array elements by the processor unit.

Applying the plurality of scrambled orthogonal codes to the calibration BFN may include distributing the plurality of scrambled orthogonal codes to each of the plurality array elements varying with time.

The scrambled orthogonal codes may be scrambled Hadamard codes.

The reference beam and the calibration beam may be synchronized.

The PAA may be a transmit PAA, the reference beam may include a reference signal component and the calibration beam may include a calibration signal component, and the method may further include sending the reference signal component and the calibration signal component to the reference BFN and calibration BFN, respectively, to generate the reference beam and the calibration beam and radiating the reference beam and the calibration beam by the transmit PAA.

The PAA may be a receive PAA, and the method may further include generating a reference signal component of the reference beam at the remote calibration terminal and transmitting the reference signal component from the remote calibration terminal to the PAA, and the PAA may use the reference signal component to generate the reference beam and the calibration beam using the reference BFN and the calibration BFN, respectively.

The reference beam may include a BFN component comprising a regular tracking beam.

The reference beam may include a reference signal component and the calibration beam may include a calibration signal component, wherein the reference signal component comprises a first spreading sequence and the calibration signal component comprises a second spreading sequence, the first and second spreading sequences being different.

The first and second spreading sequences may be a direct spread spectrum sequence ("DSSS").

The reference beam may include a reference signal component and the calibration beam may include a calibration signal component, the reference signal component and the calibration signal component may be modulated, and the reference beam and the calibration beam may be coded with direct spread spectrum sequence ("DSSS") orthogonal codes.

The reference beam may include a reference signal component and the calibration beam may include a calibration signal component, and the reference signal component and the calibration signal component may be modulated and the reference beam and the calibration beam may be coded with a direct spread spectrum sequence ("DSSS") code with repetition.

The reference beam and the calibration beam may be modulated and the reference beam and the calibration beam may be coded using a direct spread spectrum sequence ("DSSS").

The reference beam and the calibration beam may each comprise a beam pointing information and generating the calibration beam may include multiplying the beam pointing information by the plurality of scrambled orthogonal codes.

The beam pointing information may be defined as a steering vector.

Determining the calibration error may include removing the beam pointing information from the calibration beam.

The method may further include sending the beam pointing information from a processor unit connected to the PAA to the remote calibration terminal for removal.

Sending the beam pointing information may be performed just prior to formal synchronization to start calibration.

The method may further include performing coherent detection of the reference beam and the calibration beam by the remote calibration terminal using the same radio frequency ("RF") channel.

A single radio frequency ("RF") channel may be used for a reference RF channel and a calibration RF channel.

The method may further include pausing normal payload transmission of the PAA during calibration such that the PAA during the calibration is dedicated solely to the calibration.

The PAA may be mounted on a moving platform.

The moving platform may be a spacecraft in an orbit.

The orbit may be a non-geosynchronous orbit.

The non-geosynchronous orbit may be one of a Medium Earth Orbit or a Low Earth Orbit.

The orbit may be such that the spacecraft is moving relative to a celestial body.

The PAA may be a multiple beam PAA.

The method may be performed for each of a plurality of beams of the multiple beam PAA.

The method may be performed for each of the plurality of beams simultaneously.

The remote calibration terminal may be a dedicated remote calibration terminal.

The remote calibration terminal may be a ground station.

The PAA may be a component of a space-based system.

The PAA may be component of a terrestrial-based system.

The plurality of array elements may be active simultaneously during calibration.

Analyzing the reference beam and the calibration beam may include using a Least Square algorithm to minimize error under noisy samples for a better convergence.

The method may further include removing an amplitude taper from beam forming coefficients.

A method of evaluating inter-element coupling of the PAA is also provided. The method includes modulating a phase of one array element using a $\pi/2$ weight modulation and resolving with the calibration method of the present disclosure.

The method may further include determining a beam pointing error ("BPE") of the PAA using the calibration error.

The BPE may include a $\theta$ angle and $\phi$ angle and determining the BPE may include determining a first gradient of phase shift in a first axis and a second gradient of phase shift in a second axis and determining the $\theta$ and $\phi$ and angles from the first and second gradients of phase shift.

Determining the BPE may include comparing two plane gradients of post-calibration to reference beam pointing at pre-calibration to resolve a beam pointing angel offset.

The processor unit may be connected to the PAA may be a satellite onboard processor configured to digitize communication signals.

The beam pointing information may comprise a plurality of predetermined beam forming coefficients.

A method of calibration a phased array antenna ("PAA") is provided. The method includes: processing a calibration and reference beam between a calibration terminal and a plurality of array elements of the PAA and a processor unit connected to the PAA, the calibration and reference beam being modulated and coded using a direct spread spectrum sequence ("DSSS"); determining a phase error and an amplitude error for each one of the plurality of array elements by removing beam steering information of all the plurality of array elements from the received calibration beam and the received reference beam and computing the received calibration and reference beam; and transmitting the phase error and amplitude error of each one of the plurality of array elements to the processor unit connected to the PAA to remove the phase error and amplitude error from each one of the plurality of array elements.

Processing the calibration and reference beam may include simultaneously processing the calibration and reference beam.

The method may include transmitting the beam steering information of all the plurality of array elements to the calibration terminal from the processor unit connected to the PAA.

The PAA may be at least one of a transmit (TX) antenna and a receive (RX) antenna, and the processing may further include: for the RX antenna: transmitting only a reference beam from the calibration terminal through all the plurality of array elements and generating a calibration beam and the reference beam in the PAA and received at the processor unit; and for the TX antenna: simultaneously transmitting the calibration beam and the reference beam from the processor unit through all the plurality of array elements and to the calibration terminal.

A system for calibrating a phased array antenna ("PAA") having a plurality of array elements is provided, the system includes a processor unit connected to the PAA; and a remote calibration terminal linked to all the plurality of array elements of the PAA. The remote calibration terminal: receives a beam steering information of all the plurality of array elements of the PAA from the processor unit; processes a calibration and reference beam with all the plurality of array elements and the processor unit, the calibration and reference beam modulated and coded using a direct spread spectrum sequence ("DSSS"); and determines a phase error and an amplitude error for each one of the plurality of array elements by removing beam steering information of all the plurality of array elements from the received calibration and reference beam and analyzing the received calibration and reference beam.

The remote calibration terminal may transmit the phase error and amplitude error of each of the plurality of array elements to the processor unit to remove the phase error and amplitude error from the array element.

The processor unit may receive the phase error and amplitude error of each of the plurality of array elements from the remote calibration terminal and remove the phase error and amplitude error from the array element.

It is a general object of the present disclosure to provide an improved system and method to remotely calibrate an active phased array antenna that obviates the above-mentioned drawbacks and/or solves the above-mentioned challenges.

An advantage of the present disclosure is that the calibration method brings improved performance in terms of calibration error especially when tracking a moving target. In an aspect, the proposed calibration system and method uses a dedicated calibration terminal. The dedicated calibration terminal performs the computation and calibration of the remote active antenna. The phased array antenna under calibration sends/receives two signals that are coded and sent with a specific BFN coded weights sequence. This technique uses multiple elements encoding rather than a Single Element (SE) successive calibration approach. This helps reduce the overall calibration time, maintain the active antenna in working operation, and obviate using external probes located in proximity to the antenna. All phased array antenna array elements can be calibrated fast enough to compensate for changes such as temperature. In some embodiments, a few seconds per beam may be needed to calibrate one antenna. With the proposed method, multiple beams can be simultaneously calibrated, which may further reduce the calibration time in multi-beams systems.

Another advantage of the present disclosure is that the dedicated calibration terminal performs coherent detection of two signals, the reference and calibration signals, using exactly the same RF channel outside of the PAA. This approach removes the channel varying impairment significantly, which is a key advantage.

A further advantage of the present disclosure is that the calibration method uses formed beams for both signals instead of distinct sources and uses the same antenna, as opposed to two (separate antennas) as found in existing approaches. The beam steering vector is part of the matrix solving accuracy and is removed therefrom.

Yet another advantage of the present disclosure is that each signal can be modulated and coded with a long Direct Spread Spectrum Sequence (DSSS) orthogonal code with repetition to increase the coding gain. This allows operation at lower receive power, thus reducing noise level and increasing interference immunity. In addition, the long code length of the DSSS orthogonal code enables the calibration of several beams simultaneously with good cross correlation properties. The post-detection Signal to Noise Ratio (SNR) is thus improved, reducing overall calibration error.

Yet a further advantage of the present disclosure is that the calibration method is applicable to any number of array elements, any beamforming type (digital, hybrid or analog), and any number of beams.

Another advantage of the present disclosure is that the power seen in space is scattered via a coding technique that prevents exceeding the flux power density in certain directions in transmit mode and protects the calibration from interference in the receive mode.

A further advantage of the present disclosure is that the calibration error can be reduced by removing the normal amplitude taper used in formed beams. In practical PAAs, an amplitude taper is applied to the beam coefficients of the BFN to improve beam side-lobes. This amplitude weighting causes errors in such systems and can be dealt with by the calibration systems and methods of the present disclosure.

Yet another advantage of the present disclosure is that, to increase accuracy further, during calibration the phased array may be solely dedicated to calibration, which removes uncertainty, especially in transmitter. Multi-beam steering and temperature gradient variation in the array can increase calibration error if not addressed.

Based on the quality of the beam former network, and especially for digital beam forming, another advantage of the present disclosure is that only a one-point calibration of the BFN amplitude and phase range may be sufficient to calibrate its full amplitude and phase range. The whole Amplitude or Phase transfer function is calibrated at one point only. Usually picked at the center of the range. The two points referred below would be to increase the calibration precision when used with interpolation. This is an advantage compared to controlled circuit encoding (CCE) that takes a much longer calibration time.

Yet a further advantage of the present disclosure is that the calibration method, using the calibration data and element physical position, can evaluate the beam pointing error of the antenna/spacecraft. The two plane gradients (X and Y) of post calibration is compared to reference beam pointing at pre-calibration to resolve a beam pointing angle offset. This can complement spacecraft attitude control systems such as sky tracker or others. The Beam Pointing Error is the error of pointing of any arbitrary beam. This error is caused by various effects but most likely the spacecraft attitude error (satellite movement). The use of the BPE can be compared to the star tracker satellite positioner for coherency or fine adjustment as complement.

Another advantage of the present disclosure is that the calibration algorithm can be used to estimate the amplitude and phase of each interdependent RF array element, or, in other words, measure the aggregate coupling. This may be particularly useful during development for problem finding as well as in evaluating a performance specified by a customer. This, however, would not be used in remote calibration applications but rather in ground testing.

According to an aspect of the present disclosure there is provided a method for calibrating a transmitter phased array antenna (PAA). The method includes: transmitting a beam steering information of all array elements of the PAA to a calibration terminal from a processor unit connected to the PAA; processing (e.g. simultaneously) a calibration and reference beam between a calibration terminal and all the array elements and the processor unit, the calibration and reference beam being modulated and coded using a Direct Spread Spectrum Sequence (DSSS); determining a phase error and an amplitude error for each one of the array elements by removing the beam steering information of all the array elements from the received calibration and reference beam and computing the received calibration and reference beams; and transmitting the phase error and amplitude error of each one of the array elements to the processor connected to the PAA to remove the phase and amplitude errors from each array element.

In one embodiment, the receiver PAA calibration is at least one of a transmit (TX) antenna and a receive (RX)

antenna, and the step of processing of the method includes: (a) for a RX antenna, transmitting only the reference beam from the calibration terminal through all the array elements generating the calibration and reference beam received at the processor unit; and simultaneously creating the calibration and reference beam from the processor unit through all the array elements and to the calibration terminal; and (b) for a TX antenna, simultaneously transmitting the calibration and reference beam from the processor unit through all the array elements and to the calibration terminal.

According to another aspect of the present disclosure there is provided a system for calibrating an active phased array antenna (PAA). The system includes: a processor unit connected to the PAA; and a remote calibration terminal linked to all array elements of the PAA for receiving a beam steering information of all the array elements of the PAA from the processor unit, the remote calibration terminal processing (e.g. simultaneously) a calibration and reference beam with all the array elements and the processor unit, the calibration and reference beams being modulated and coded using a Direct Spread Spectrum Sequence (DSSS), the remote calibration terminal determining a phase error and an amplitude error for each one of the array elements by removing the beam pointing information of all the array elements from the received calibration and reference beam, analyzing the received calibration and reference beam, and transmitting the phase and amplitude errors of each element to the processor unit to remove the phase and amplitude errors from each array element.

The method may use a formed beam as reference signal along with the calibration signal and sent from the same phased array antenna. The beam steering information may be removed from the solution and help to decrease the calibration error. The method may use the same channel for the reference and calibration channel removing the common impairments. The method may use a Direct Spread Spectrum Sequence with high cross-correlation property to differentiate the two carriers (calibration and reference) using the same channel and capable of calibrating several beams simultaneously. The method may use a direct Least Square (LS) algorithm or equivalent optimizer (e.g. overdetermined equations, maximum likelihood) to minimize the error under noisy samples for a better convergence.

The transmitter and receiver amplitude taper may be removed from the beam formed coefficients to achieve better calibration error performance (e.g. apply an amplitude taper reversal for the calibration beam). In the case of the transmitter, the output power may be reduced to be able to remove the "hardware taper" present from the staged zone power amplifiers. The Hadamard codes may be scrambled at the transmission to avoid having high peaks of power localized on earth (except for the reference beam pointed to the terminal). This helps spread the signal flux density (Equivalent Power-Flux Density (EPFD) constraints) on earth for minimal interference for other and like systems. Similarly, this may be done in the receiver to protect the algorithm from being impacted by directional high-power interference. The beam steering information on TX or RX may be known by the On-Board Processor ("OBP") of the spacecraft and sent to the calibration terminal for removal to help reducing the error solution. This information (the beam steering information) may be sent just prior to formal synchronization to start the calibration. This may include all pointing error compensation by the spacecraft. The phased array antenna normal payload transmission may be interrupted while performing calibration to minimize calibration error. The antenna may be solely dedicated to the calibration function during calibration. A code repetition of the spreading code may be performed to lower the noise level at the receiver and thus increase the SNR and calibration error performance. The amplitude and phase BFN may be assumed to be monotonic and linear, and the calibration may therefore be performed at one point only reducing calibration time (the whole amplitude or phase transfer function calibrated at one point, usually picked at the center of the range); if not, two additional points may be added to better assess the transfer function. The two additional points may increase the calibration precision when used with interpolation.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
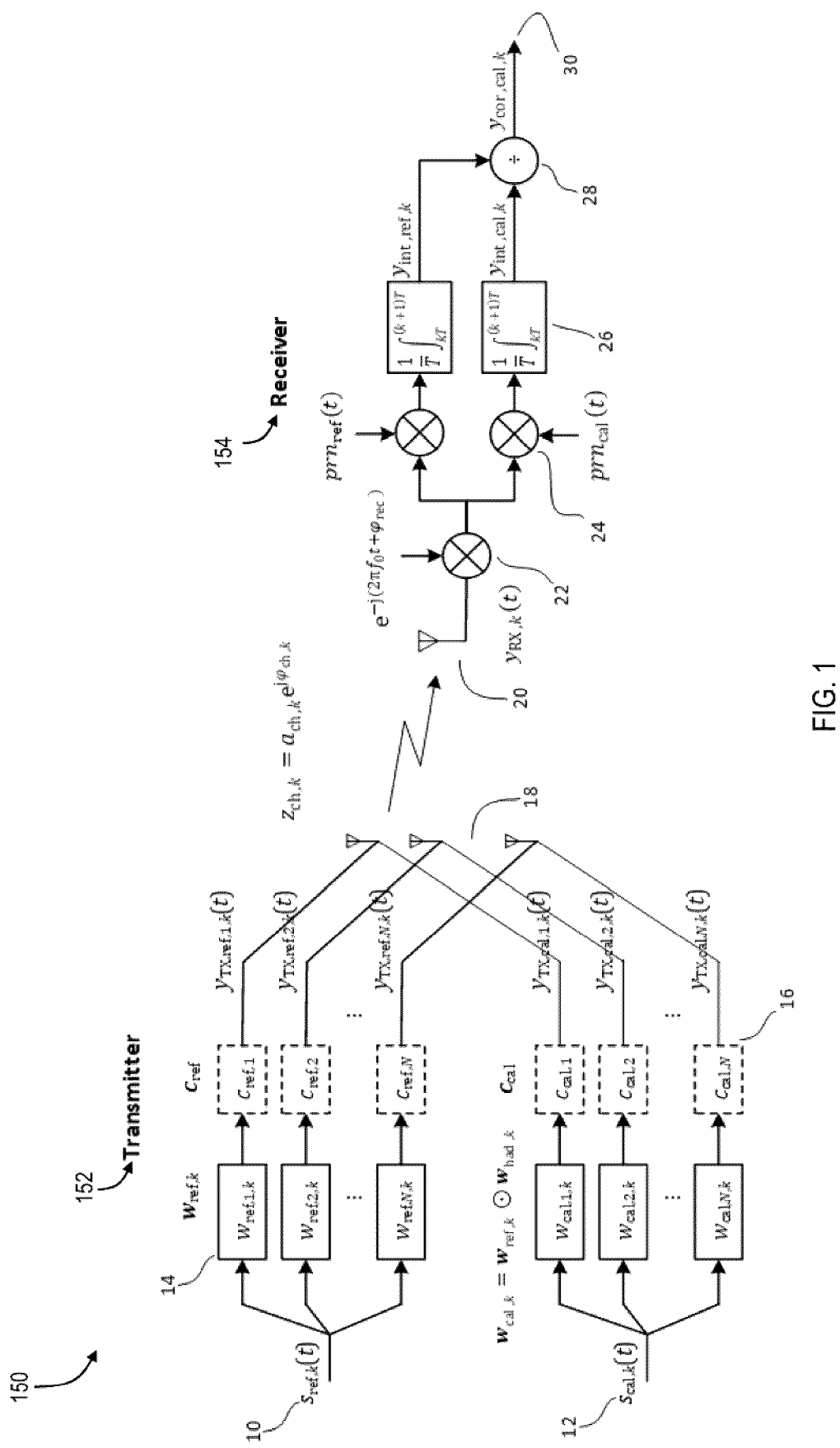
FIG. 1 is a schematic graphical representation of the transmitter calibration method showing how the two signals (reference and calibration) paths and processing up to the end result, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure relates generally to phased array antennas ("PAA"), and more particularly to systems and methods for remotely calibrating a PAA. In a particular case, the PAA may be located on a spacecraft (e.g. as part of a satellite communication system). The PAA may be an active PAA. Systems and methods for evaluating coupling between antenna elements (radio frequency ("RF") coupling estimation) of a PAA and for beam pointing error ("BPE") estimation of a PAA are also provided. A derivative of the calibration method may be used to perform the RF coupling estimation and/or to perform the BPE estimation of the PAA. The systems and methods of the present disclosure may be used for PAAs using analog beamforming and/or PAAs using digital beamforming. The calibration systems and methods described herein are compatible with timeslot implementations (beam hopping), though this is not a requirement and in some cases may be implemented in non-beam hopping implementations.

Generally, the calibration systems and methods described herein may be used to determine amplitude and phase errors for individual array elements of a PAA. The PAA needs to control its individual array elements amplitude and phase error contributors for the following reasons: to maintain beam pattern and signal power; to keep the side lobes level under control; and to minimize the PAA loss of efficiency. The term "array element" as used herein refers to any component of the full RF path of the PAA and may include any one or more of a BFN RF path, an amplification stage, a filtering component, a polarizer, and the antenna (radiating) element itself.

The present disclosure provides a system and method for calibrating a phased array antenna ("PAA"). The PAA may be a component of a moving spacecraft, an aircraft, or a High-Altitude Platform ("HAP"), or may be a component of a terrestrial system (on-ground, such as on Earth, other planets or moons). Thus, while the embodiments of the calibration systems and methods described in the present disclosure refer to satellite based PAAs, it is to be understood that such application is one example and that the calibration systems and methods described herein may be applied to PAAs in contexts other than satellite communication. The MDA proprietary processing method is insensitive to channel variations, delivers better error estimation and provides high processing gain for difficult channel conditions Analog beamforming in multi-beam DRAs may take a long time to calibrate when the number of beams B and the number of array elements N are high. The number of RF beamformer adjustments to calibrate, being N×B, could be in the several thousands. Being able to calibrate the beams simultaneously is a great advantage as it is proposed herein.

In an aspect, the present disclosure provides systems and methods for remote in-orbit calibration of a PAA onboard a spacecraft (satellite) using a ground terminal. The second calibration approach, which is the type presented herein, has the advantages to lower the cost and complexity of the PAA and satellite payload.

There are two types of calibration that need to take place when building an active phased array antenna. A first calibration type is the calibration performed when the unit is built, to get the reference coefficients of the particular unit. Once the unit is shipped, launched and in operation, a sustaining periodical calibration is required to overcome temperature, ageing, and radiation effect on active array elements. While the presented method can be applied to the first category of calibration, the emphasis in the present disclosure is on the remote calibration of the phased array antenna. Further, while the system and method of the present disclosure can be applied equally to terrestrial or space systems, the focus of the will be on the space systems.

In an aspect, a method of calibrating a PAA having a plurality of array elements is provided. The method includes transmitting a beam steering information of each of the plurality of array elements to a calibration terminal from a processor unit connected to the PAA. The method further includes simultaneously processing a calibration beam and a reference beam between the calibration terminal and the plurality of array elements and the processor unit, where the calibration beam and reference beam are modulated and coded using a Direct Spread Spectrum Sequence ("DSSS") system. The calibration beam may be coded using a plurality of scrambled orthogonal codes (orthogonal matrix). The scrambled orthogonal codes may be Hadamard codes. The method further includes determining a phase error and amplitude error for each respective one of the plurality of array elements by removing the beam steering information of the plurality of array elements from the received calibration beam and reference beam and analyzing the received calibration beam and reference beam. The method further includes transmitting the phase error and amplitude error of each respective one of the plurality of array elements to the processor unit to remove the phase error and amplitude error from an operating signal of each respective one of the plurality of array elements.

In another aspect, a method of calibrating a PAA having a plurality of array elements is provided. The method includes using scrambled Hadamard codes to remove radiated peak power to reduce interference issues.

In another aspect, a method of calibrating a PAA having a plurality of array elements is provided. The method includes using a same RF channel(s) for both a reference signal and a calibration signal. Using the same RF channels for reference and calibration signals may allow for a complete removal of the varying channel.

In another aspect, a method of calibrating a PAA having a plurality of array elements is provided. The method includes evaluating an antenna element complex coupling using a $\pi/2$ weight modulation and resolving with the calibration method of the present disclosure.

In another aspect, a method of calibrating a PAA having a plurality of array elements is provided. The method includes evaluating a beam pointing error (BPE) of the PAA using calibration results obtained using the calibration method of the present disclosure.

In another aspect, a system for calibrating a PAA is provided. The system includes a PAA having a plurality of array elements, a processor unit connected to the PAA, and a remote calibration terminal linked to each the plurality of array elements of the PAA, the remote calibration terminal for receiving a beam steering information of the plurality of array elements of the PAA from the processor unit. The remote calibration terminal simultaneously processes a calibration and reference beam [with all the array elements and the processor unit]. The calibration and reference beam is modulated and coded using a DSSS. The remote calibration terminal determines a phase error and an amplitude error for each of the plurality of array elements by removing the beam steering information of the plurality of array elements from the received calibration and reference beam. The remote calibration terminal analyzes the received calibration and reference beam and transmits the phase error and the amplitude error of each of the plurality of array elements to the processor unit for removal of the phase error and the amplitude error from an operating signal of the array element.

In another aspect, a system and method for calibrating remotely a phased array antenna of a satellite or terrestrial system is provided. The amplitude and phase variations of active antennas used in PAAs are prone to vary over life, temperature, radiation, etc. and need to be corrected frequently to preserve side lobes level and antenna gain. The system utilizes a dedicated calibration terminal on ground capable of performing remote calibration of an active antenna having N radiating elements. The antenna may be a receive (Rx) antenna or a transmit (Tx) antenna. The calibration terminal may perform remote calibration of both Rx antennas and Tx antennas, which in some cases may be present on the same platform (e.g. on the same spacecraft). A particular modulation, coding and level control allows sending a reference and calibration signal using the same antenna. The use of the exact same communications channel for the calibration and reference signals removes the variations by its differential decoding. The power level of each transmitter element is coded such that the Equivalent Power-Flux Density (EPFD) on ground is controlled. Multiple coding methods may be used to increase the post detection Signal to Noise Ratio (SNR) and reduce the residual calibration error. Several beams may be calibrated simultaneously, which reduces the overall calibration time. The method may be applied to several other applications such as remote element failure detection, inter-element coupling evaluation, spacecraft beam pointing error, and antenna manufacturing testing & calibration.

Referring now to FIG. 1, shown therein is a calibration system 150 for implementing a calibration process for a PAA (e.g. PAA 50 or 54 of FIG. 3), according to an embodiment. FIG. 1 illustrates the theoretical background of the calibration method of the present disclosure.

The transmitter PAA calibration process will be demonstrated. The receiver PAA calibration is a similar process with minor differences which will be highlighted but not repeated.

FIG. 1 includes a transmitter component 152 and a receiver component 154. In the example shown in FIG. 1, the transmitter component 152 is located at a satellite (e.g. satellite 60 of FIG. 3) and the receiver component 154 is located at a calibration terminal (e.g. calibration terminal 58 of FIG. 3).

FIG. 1 illustrates two coherent signals, including a reference signal 10 and a calibration signal 12, at the transmitter 152 in the form:

$$S_{ref,k}(t) = a_{ref,k} \text{prn}_{ref}(t) e^{j(2\pi f_0 t + \varphi_{ref,k})}$$

$$S_{cal,k}(t) = a_{cal,k} \text{prn}_{cal}(t) e^{j(2\pi f_0 t + \varphi_{ref,k})}.$$

The two signals 10, 12 are generated by the transmitter 152. The two signals 10, 12 are generated with an amplitude $\alpha$, a different pseudo-random code prn (e.g. a first prn for the reference signal 10 and a second prn for the calibration signal 12), modulated with a carrier of frequency $f_o$ and phase $\varphi$.

The transmitter 152 includes a beamformer 14 (or beamforming network or "BFN"). The beamformer 14 includes a plurality of BFN elements. The reference and calibration signals 10, 12 are distributed to reach the beamformer 14, which applies a complex weight w.

In the case of the reference signal 10, w is a steering vector aimed at the calibration terminal 58. The steering vector may also be referred to as beam pointing information.

In the case of the calibration signal 12, w is the same steering vector of the reference signal 10 multiplied by a matrix of orthogonal vectors (or orthogonal codes). The matrix may be a Hadamard matrix (such as shown in FIG. 1 and as described throughout the present disclosure). The orthogonal Hadamard vectors are convenient because they are composed of +1 and −1, which is easily implemented as a 180° phase shift of a complex number. In other embodiments, other types of orthogonal vectors may be used, such as FFT-derived orthogonal vectors. Such other types of orthogonal vectors can, however, be more difficult to implement and may thus be less preferred as compared to Hadamard vectors.

N is the number of array elements (or "elements") in the PAA and k is the number of beamforming network ("BFN") codes (e.g. Hadamard codes) sent, where k≥N. The complex weight deviation the calibration is trying to resolve is $C_{cal}$ 16.

Once transmitted from all N elements and K bursts, the combined signal 18 is:

$$y_{TX,k}(t) = y_{TX,ref,k}(t) y_{TX,cal,k}(t)$$

Developing further and breaking down the components:

$$y_{TX,k}(t) = \left( \begin{bmatrix} w_{ref,1,k} \\ w_{ref,2,k} \\ \vdots \\ w_{ref,N,k} \end{bmatrix} \odot \begin{bmatrix} c_{ref,1} \\ c_{ref,2} \\ \vdots \\ c_{ref,N} \end{bmatrix} \right) s_{ref,k}(t) + \left( \begin{bmatrix} w_{cal,1,k} \\ w_{cal,2,k} \\ \vdots \\ w_{cal,N,k} \end{bmatrix} \odot \begin{bmatrix} c_{cal,1} \\ c_{cal,2} \\ \vdots \\ c_{cal,N} \end{bmatrix} \right) s_{cal,k}(t)$$

From the equation at paragraph [0068], when adding noise and decomposing, we get 20:

$$y_{TX,k}(t) = 1_N^T G_{D,k} y_{TX,k}(t) z_{ch,k} + \eta_{RX,k}(t)$$

where $\eta_{RX,k}(t)$ is a complex additive white Gaussian noise (AWGN) with each part having a power spectral density of $N_0/2$, $1_N$ is a column vector containing N ones, and $G_{D,k} = \mathrm{diag}(g_k)$ is the steering vector.

The receiver 154 includes RF down-conversion 22, code autocorrelation 24, integration 26, and channel variation removal 28 to produce an output 30 in the form:

$$y_{cor,cal,k} = 1_N^T (g_k \odot W_{cal,k} \odot c_{cal}) Z_{cor,cal,k} + \eta_{cor,cal,k}$$

The steps 22, 24, 26, and 28 are performed to get to baseband, retrieve the complex signal and demodulate the reference and calibration signals individually. Once integrated, the synchronization of the reference is applied to the calibration signal to remove the channel variations.

Once the channel effect is removed at 28, $z_{cor}$ becomes a constant and the resolution of the matrix is a typical linear square problem:

$$\vec{c} = (G^H H^H H G)^{-1} G^H H^H \vec{y}$$

where superscript H denotes the Hermitian operation (conjugate transpose). The Least Square (LS) approach can be employed to estimate c representing the weight deviation (e.g. weight deviation 44 of FIG. 2) of the transmitter 152 to resolve.

Figure 2:
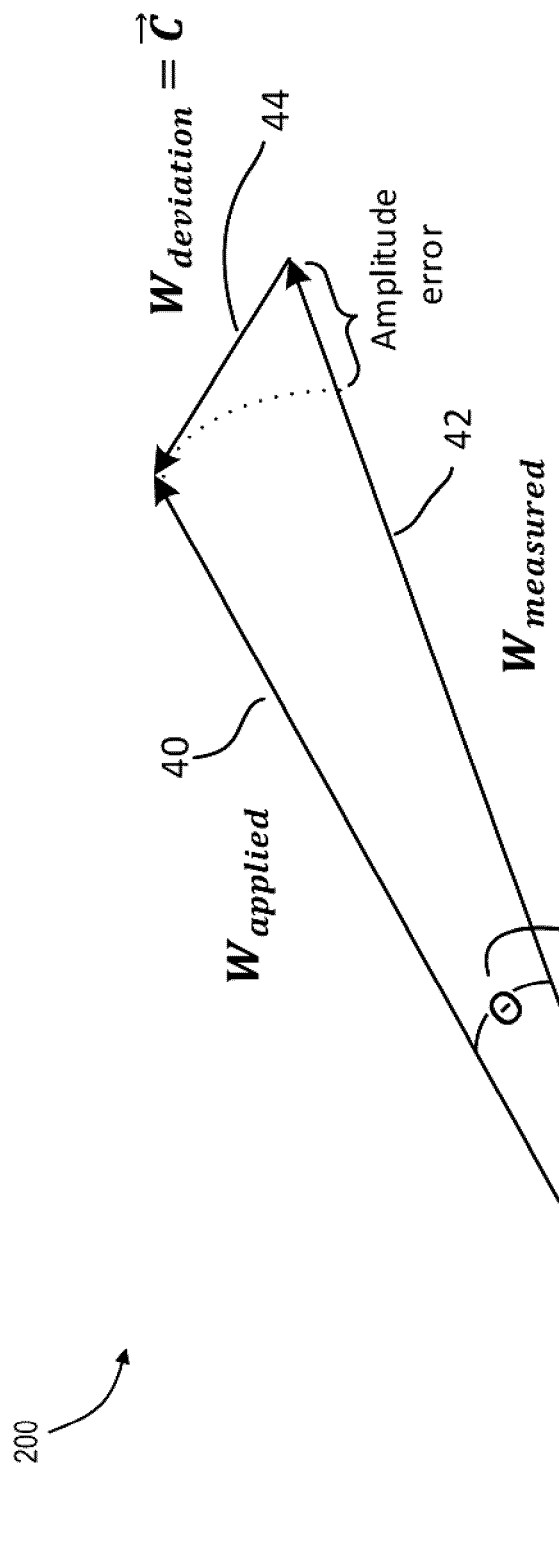
FIG. 2 is a schematic representation of the cumulated error of a single active array element that is measured and/or resolved with the calibration method of the present disclosure, showing the amplitude and phase difference with the wanted or original signal present on this particular element, according to an embodiment.

Referring now to FIG. 2, shown therein is a schematic representation 200 of a cumulated error of a single active array element that is measured and/or resolved with the calibration method of the present disclosure, according to an embodiment. Representation 200 shows the amplitude and phase difference with the wanted or original signal present on this particular element.

Active phased array antennas using either digital or analog beamforming have RF active and passive circuitry from the beam to the radiating element. The RF active and passive circuitry vary over temperature, ageing & radiation, which affects the amplitude and phase of the individual signal of each element path. Such effect is illustrated in FIG. 2. The beamforming weight applied 40 to an array element is not what is actually present (measured 42), due to the presence of the above-mentioned effects. The resulting effect is a misalignment 44 of the combined signals once forming beams. The misalignment 44 manifests as a loss of beam shape in space as well as a decrease of the maximum antenna network gain. The objective of the calibration is to be able to resolve the complex deviation 44 for each element and correct the complex deviation 44 in the PAA beamformer (e.g. beamformer 14 of FIG. 1).

Pre-launch, on-ground calibration is performed during Satellites' Assembly, Integration and Test (AIT) at a manufacturing site. This is done to find the reference BFN coefficients for each active array element to generate a "perfect beam"; remove the electrical & mechanical variations; and calibrate over frequency and temperature. The present disclosure is aimed, in one aspect, at solving the problem of these variations by calibrating the PAA on the ground and in-orbit from time-to-time to ensure element integrity and composure.

There are two methods used to solve this problem, especially in spacecraft antennas: by using on-board calibration or remote calibration. On-board calibration is more expensive from a hardware point of view and less from an overall system deployment. Remote calibration brings almost no additional cost on the spacecraft but incurs a small system implementation cost using a calibration ground station. The present disclosure is directed to remote calibration, as it brings lower overall cost on the system and little implementation constraints on the satellite. Thus, the remote calibration approach of the present disclosure may provide significant business case advantages over an on-board calibration solution, particularly for large satellite constellations (which can include several hundred/thousand satellites).

Besides the aforementioned errors, which can be removed with calibration, the following error sources cannot be removed by any calibration type: quantization errors (BFN Number of Bits (NoB) of amplitude and phase settings); non-linear errors (AM/AM (Amplitude to Amplitude distortion), AM/PM (Amplitude to Phase distortion), intermodulation of RF components related to signal dynamics); residual temperature variations of RF components (active & passive) between calibrations; inter-element RF isolation; dynamic mutual coupling of antenna radiating elements; and frequency dispersion.

Figure 3:
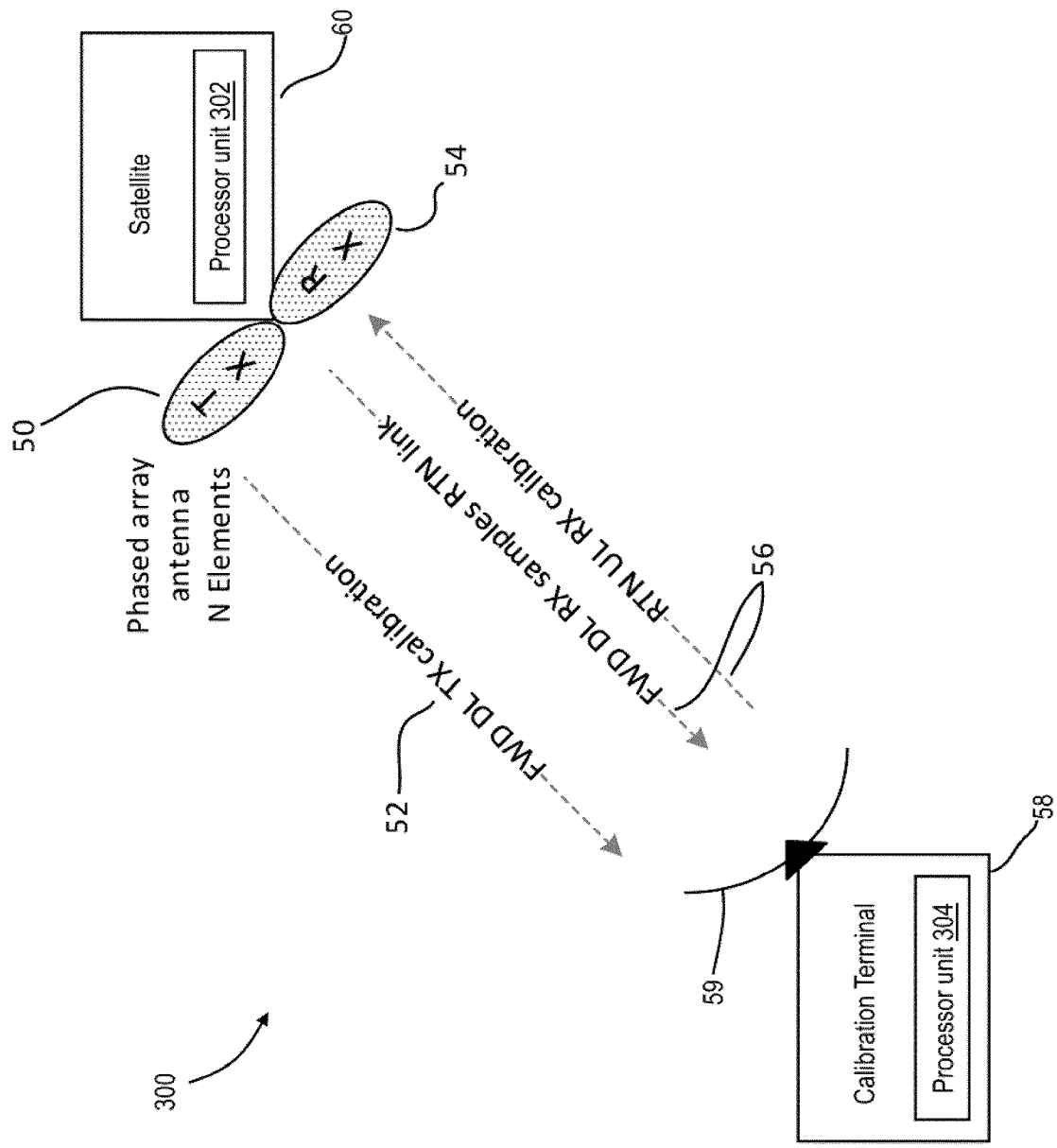
FIG. 3 is a high-level schematic representation of a calibration space/ground system showing the system components used to achieve the transmitter and receiver phased array calibration (a terrestrial system could also be used as an example where the method is applicable), according to an embodiment.

Referring now to FIG. 3, shown therein is a system 300 for remote calibration of a PAA, according to an embodiment. The embodiment of system 300 includes the calibration method of the present disclosure used for spacecraft mounted PAAs. For example, the system 300 may implement the method 150 of FIG. 1 or any one or more of the systems 400, 500a, 500b of FIGS. 4, 5A, and 5B.

The system 300 includes a spacecraft 60 and a ground station 58 referred to as a "calibration terminal".

The spacecraft 60 includes a transmitter antenna (Tx PAA) 50 and a receiver antenna (Rx PAA) 54 mounted thereon. In other variations, the spacecraft 60 may be another platform on which the PAA being calibrated is mounted, such as an aircraft, HAP, or terrestrial system. The platform may be moving relative to the calibration terminal 58. Further, in variations, the platform may include only the Rx PAA 54 or only the Tx PAA 50 (or a plurality thereof).

While the satellite 60 of FIG. 3 is illustrated as having both Tx and Rx antennas 50, 54, in other embodiments the satellite 60 may include only a Tx antenna 50 or only an Rx antenna. Further, in variations, the satellite 60 may include a plurality of Tx antennas 50 and/or a plurality of Rx antennas 54 and the system 300 may perform calibration for each of the plurality of antennas. Further, in some embodiments, the Tx antenna 50 and the Rx antenna 54 may be implemented as a single "combined" Tx/Rx antenna. Such a combined Tx/Rx antenna is configured to perform transmit and receive functions within the same aperture.

The satellite 60 includes a processor unit 302. The processor unit 302 may also be considered or referred to as a "calibration processing subsystem". The processor unit 302 may also be considered or referred to as a "calibration processing subsystem". The processor unit 302 may include a processor, such as a CPU, in communication with a data storage component, such as a memory. The data storage component may be used to store various forms of data generated or used by the calibration methods of the present disclosure (and derivative methods thereof). The data stored in the data storage may include data generated by the processor unit 302 or data received by the processor unit from another device (e.g. processor device 304) and which is subsequently processed by the processor device 302. The processor device 302 may include a communication interface for facilitating communication of data and/or signals between the processor device 302 and another device. The processor device 302 may transmit and receive data or signals via the communication interface.

The processor unit 302 is a processing device configured to perform one or more steps, functions, or operations of the calibration methods (or of methods derivative of the calibration method such as BPE estimation and RF coupling estimation) described herein. The processor unit 302 may be a device specifically adapted to perform only such steps, functions, or operations. In some embodiments, the processor unit 302 may be an onboard processor ("OBP") of the satellite 60 or a component thereof. In other embodiments, such as for fully analog payloads, the processor unit 302 may be a simpler device configured to perform a relatively limited number of functions for implementing the calibration method.

In an embodiment, the spacecraft 60 is in a non-geostationary or non-geosynchronous orbit. The spacecraft 60 may be in a low earth orbit or a medium earth orbit. The orbit of the spacecraft 60 may be any orbit in which rotation of the spacecraft 60 is not matched to Earth's rotation (i.e. the spacecraft 60 is moving relative to Earth). While Earth is specifically mentioned it is to be understood that the term "orbit" or a derivative thereof herein is intended to refer to orbit of a celestial body generally and that Earth is one example of such a celestial body.

The calibration terminal includes an antenna component 59 for transmitting and/or receiving signals to and from the satellite 60. The calibration terminal 58 also includes a processor unit 304. The processor unit 304 may also be considered or referred to as a "calibration processing subsystem". The processor unit 304 may include a processor, such as a CPU, in communication with a data storage component, such as a memory. The data storage component may be used to store various forms of data generated or used by the calibration methods of the present disclosure (and derivative methods thereof). The data stored in the data storage may include data generated by the processor unit 304 or data received by the processor unit from another device (e.g. processor device 302) and which is subsequently processed by the processor device 304. The processor device 304 may include a communication interface for facilitating communication of data and/or signals between the processor device 304 and another device. The processor device 304 may transmit and receive data or signals via the communication interface.

The processor unit 304 is a processing device configured to perform one or more steps, functions, or operations of the calibration methods (or of methods derivative of the calibration method such as BPE estimation and RF coupling estimation) described herein. The processor unit 304 may be a device specifically adapted to perform only such steps, functions, or operations. In some embodiments, the processor unit 302 may be a component of a larger processing system configured to perform functions other than calibration (or derivative methods thereof). In some embodiments, such as for certain Rx antenna calibration implementations, the processor unit 302 may be a simpler device configured to perform a relatively limited number of functions for implementing the calibration method (e.g. generating a reference signal such as in FIG. 5B described below).

The calibration terminal 58 performs computation of a Forward (FWD) Downlink (DL) transmitter calibration 52 and a Return (RTN) Uplink (UL) receiver calibration 56. Although the RTN UL receiver calibration could be performed at the spacecraft, the proposed location for data processing is on-ground, i.e. at the calibration terminal 58, as this approach advantageously reduces size, weight and power consumption of some on-board antenna equipment.

When calibrating the spacecraft transmitter antenna 50, only the downlink (DL) is used 52.

When calibrating the receiver antenna 54, two links are used 56 including a calibrating signal link in UL and a received samples return link in DL (returning samples to the terminal 58 for processing and determination of calibration error), as illustrated in FIG. 3. In embodiments, such as in FIG. 5A, where calibration processing including calibration error determination is performed on the satellite 60, the received samples return link in DL may not be required (as processing of the samples is performed by the processor unit 302 of the satellite 60). In other cases, the calibration processing is performed at the terminal 58 by the processor unit 304 (and not by the processor unit 302 of the satellite 60), such as shown in FIG. 5B. Calibration processing may include an analog loop-back of the reference beam and the calibration beam in cases where the satellite 60 does not have an OBP.

The location of the calibration terminal 58 may depend on the application. On fixed GEO (Geostationary Orbit) satellite systems, a remote location with low service demand may be chosen. This approach is primarily to avoid interference with other systems and for compliance with regulations. The system 300 may apply the same or similar approach to embodiments using moving satellite systems, such as MEO (Medium-Earth Orbit) or LEO satellite systems, where the payload functions of the PAA may be momentarily interrupted to perform calibration in areas with low service demand. In terrestrial system applications, the top of a mountain or building may be appropriate. Such approach may minimize capacity reduction in operation and interference. In some embodiments, more than one calibration terminal 58 may be used to accelerate calibration time of a whole satellite fleet and/or for redundancy. The UL and DL link budget of the reference and calibration carrier should be established. The quality of the link and the overall processing may determine the calibration error capability.

Figure 4:
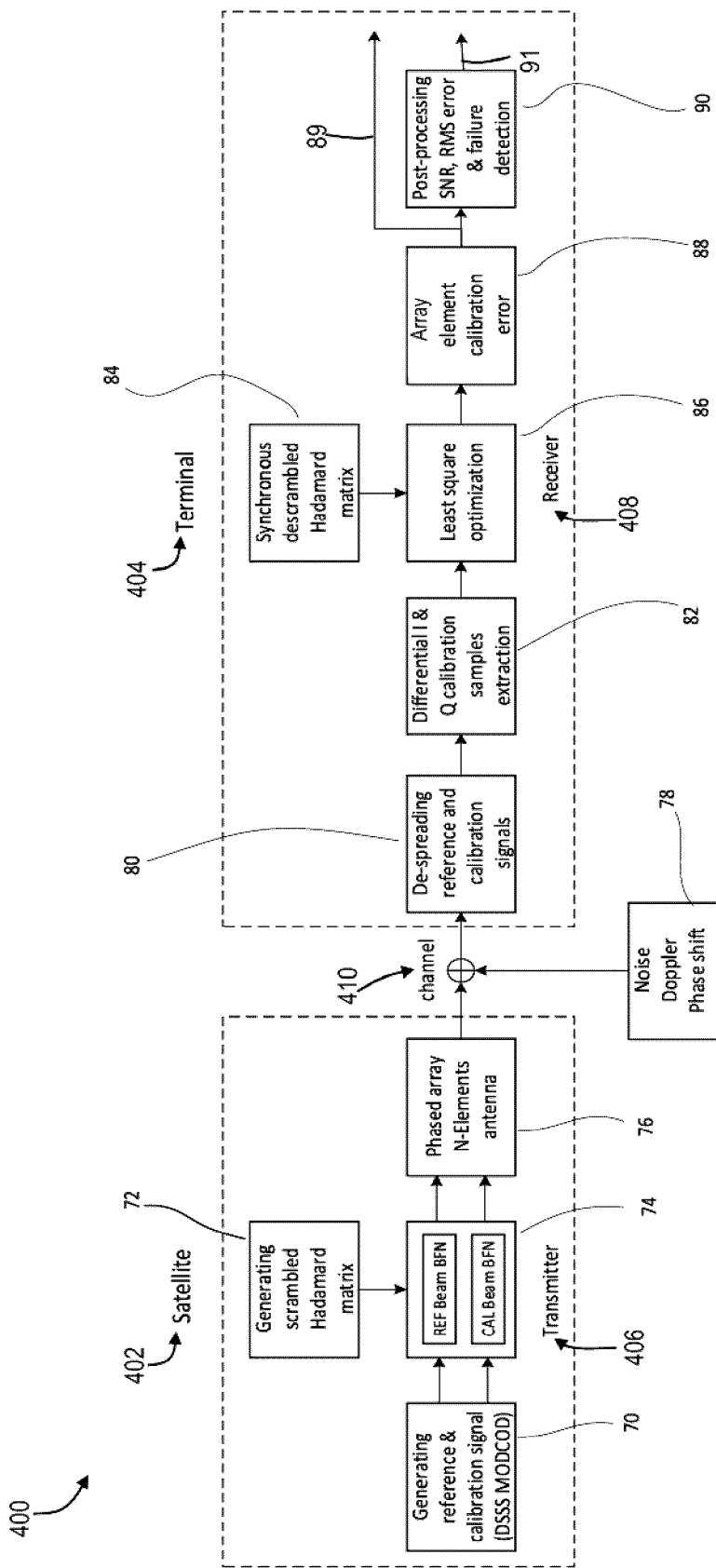
FIG. 4 is a functional block diagram of a calibration method showing the processing involved in the transmission and reception of the transmitter phased array antenna calibration, according to an embodiment.

Referring now to FIG. 4, shown therein is a system 400 for calibration signal processing for a transmitter antenna, according to an embodiment.

The system 400 includes a satellite 402 and a calibration terminal 404. The satellite 402 includes a transmitter 406. The transmitter 406 may be a component of or otherwise connected to or in communication with a processing unit of the satellite. The calibration terminal 404 includes a receiver 408. The receiver 408 may be a component of or otherwise connected to or in communication with a processing unit of the terminal 404. The satellite 402 and the calibration terminal 404 may be the satellite 60 and calibration terminal 58 of FIG. 3, respectively.

The transmitter 406 includes a reference and calibration signal generator module 70, a scrambled Hadamard matrix generator module 72, a beamforming network (BFN) module 74 including a reference (REF) beam BFN and a calibration (CAL) beam BFN, and a PAA having N array elements 76.

The receiver 408 includes a de-spreading reference and calibration signals module 80, a differential I and Q calibration samples extraction module 82, a least square optimization module 86, a synchronous descrambled Hadamard matrix module 84, an array element calibration error generator module 88, and a post-processing, SNR, RMS error and failure detection module 90.

The system 400 further includes a wireless RF channel 410.

Figure 7:
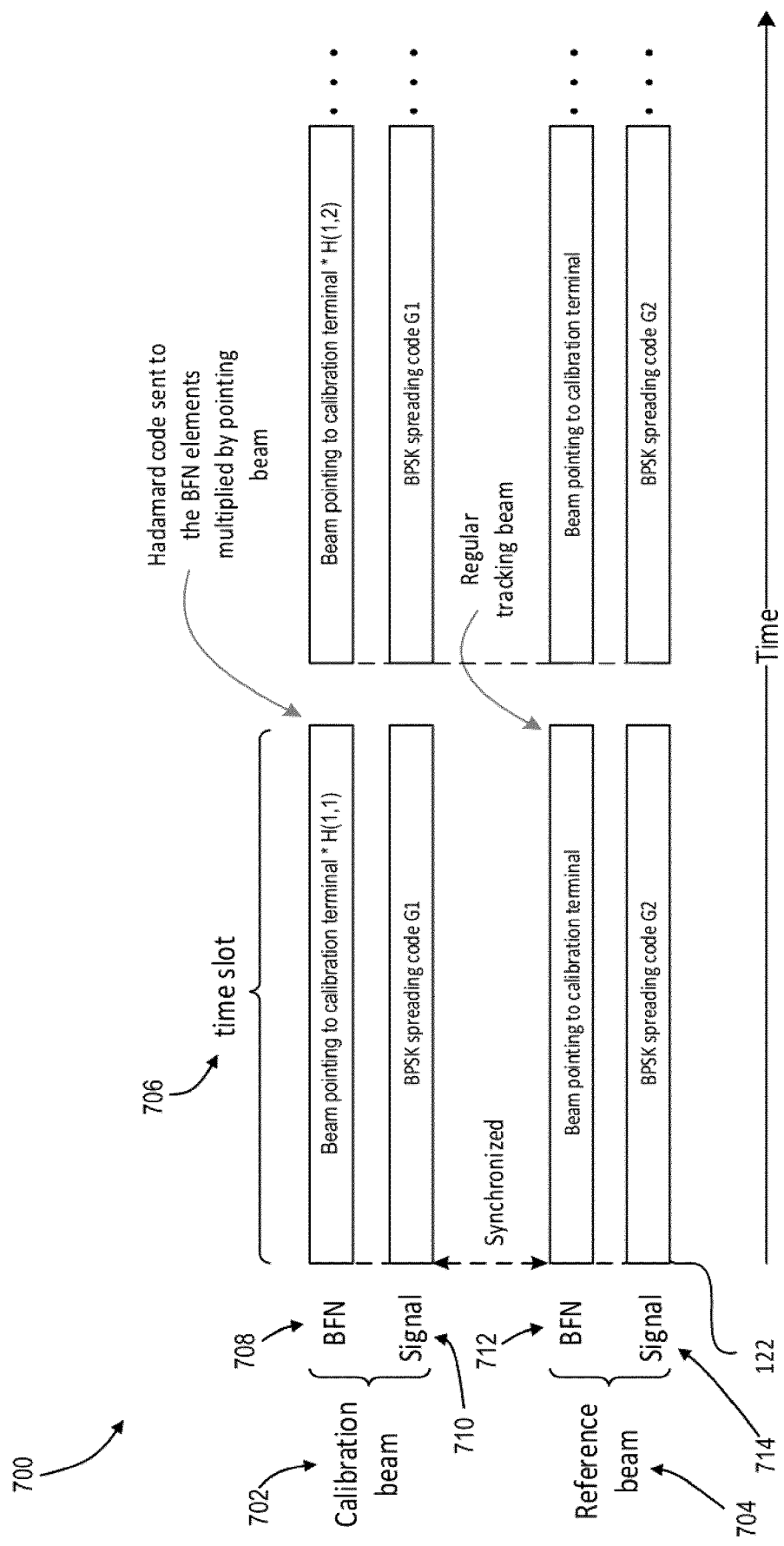
FIG. 7 is a schematic graphical representation of calibration method showing how the two signals (reference and calibration) are modulated, coded and synchronized to help the receiver detection at the other end, according to an embodiment.

In FIG. 4, the transmitter antenna calibration signal processing is depicted. The transmitter 406 may generate two signals 70 using two different spreading orthogonal code (Gold or else) with good cross-correlation properties such as in Direct Spread Spectrum Sequence (DSSS) systems. In an embodiment, the two signals 70 may be of a few tens of megahertz (MHz) bandwidth. The two signals are both modulated (such as by BPSK (Binary Phase Shift Keying), QPSK (Quadrature Phase Shift Keying), or the like) and occupy exactly the same bandwidth. In the case of a multiple beam system, the multiple beams can be calibrated simultaneously using different orthogonal codes. The timing, samples, and jitter are tightly synchronized between the two carriers to help detection, recovery, and performance at a demodulator (as illustrated in FIG. 7, below).

An Hadamard matrix is generated at 72 of size L×L such that:

$$N < 2^L$$

where N is the number of array elements. Another condition is typically to have L, L/12 or L/20 being a power of two (2), as well as HA*H being of full rank and therefore invertible (H is the Hadamard matrix). This generates full orthogonal rows usable for discriminating the antenna array elements at reception. The calibration signal is modulated at the beamforming network 74 with a scrambled Hadamard sequence using the Hadamard matrix generated at 72. The reference signal receives the beamforming weights to form a regular pointing beam (tracking or not).

Both signals are transmitted via the phased array antenna 76, altered thru the RF channel 410 with noise, phase shift, attenuation and possibly Doppler for moving sub-systems 78.

At the calibration terminal 404, a demodulation is performed including de-spreading the two carriers (reference and calibration signals) with the appropriate code 80.

The calibration signal is obtained by differentiation with the reference signal at 82. This can include a complex division and normalization. The operation at 82 typically removes any common impairments affecting the two carriers by the channel 410, except for some de-correlated noise (i.e. source jitter in transmitter, differential noise in receiver, etc.).

With the beam steering information, a de-scrambled Hadamard code 84, a least square optimization 86 is performed to get the values of the amplitude and phase information of the individual elements relative to each other. This is effectively performing the following equation described above in reference to FIG. 1: $\vec{c} = (G^H H^H H G)^{-1} G^H H^H \vec{y}$. A calibration error matrix is generated at 88.

Signal-to-Noise Ratio (SNR), overall RMS (Root Mean Square) error, calibration validation and element failure evaluation is performed at 90.

The calibration error determined at 88 and the determinations at 90 are outputted at 89 and 91, respectively. Outputting the determinations may including sending such information, or subset or derivative thereof, to the satellite 60 or other system so that subsequent corrective action can be performed (e.g. adjusting BFN reference coefficients to remove calibration error). For example, the calculated error matrix is sent to the spacecraft phased array management. The calculated error matrix is added to the BFN reference coefficients to remove the amplitude and phase error at each element that was detected during calibration.

Figure 5A:
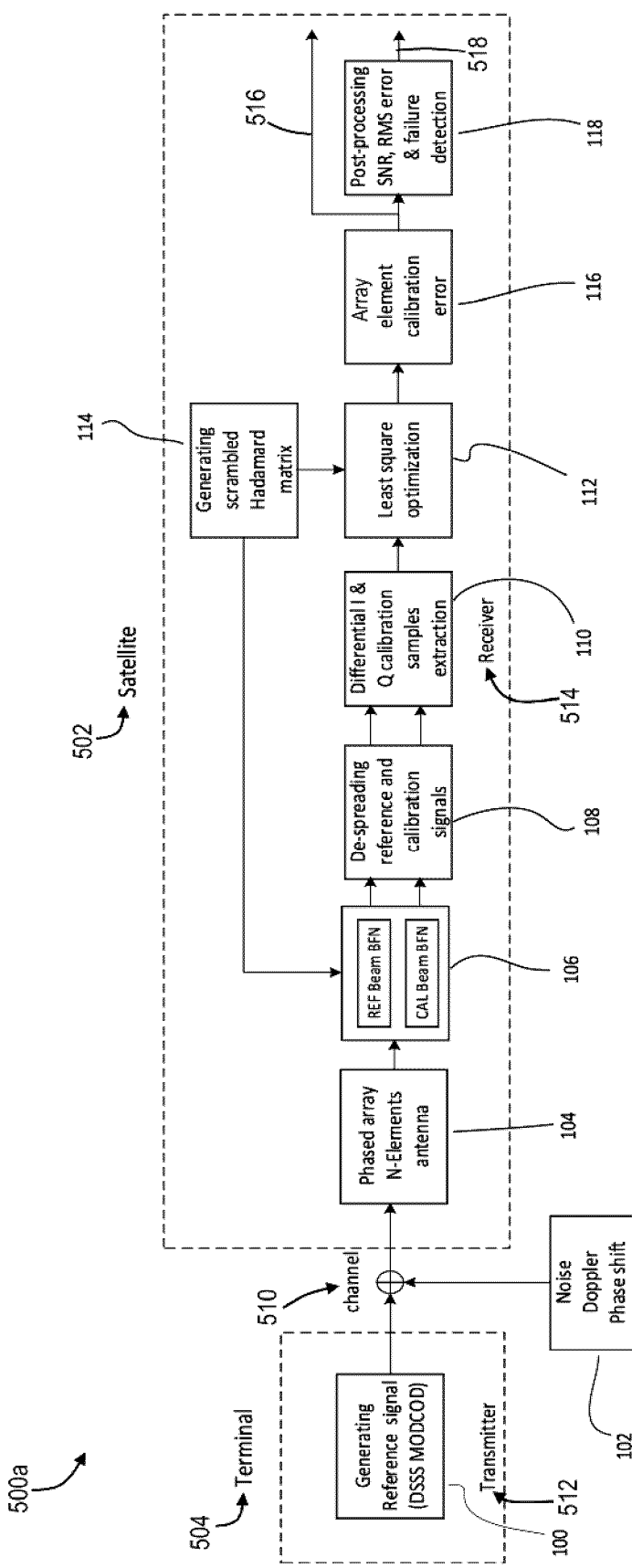
FIG. 5A is a functional block diagram of a calibration method showing the processing involved in the transmission and reception of the receiver phased array antenna calibration, the calibration processing performed on the satellite, according to an embodiment.
Figure 5B:
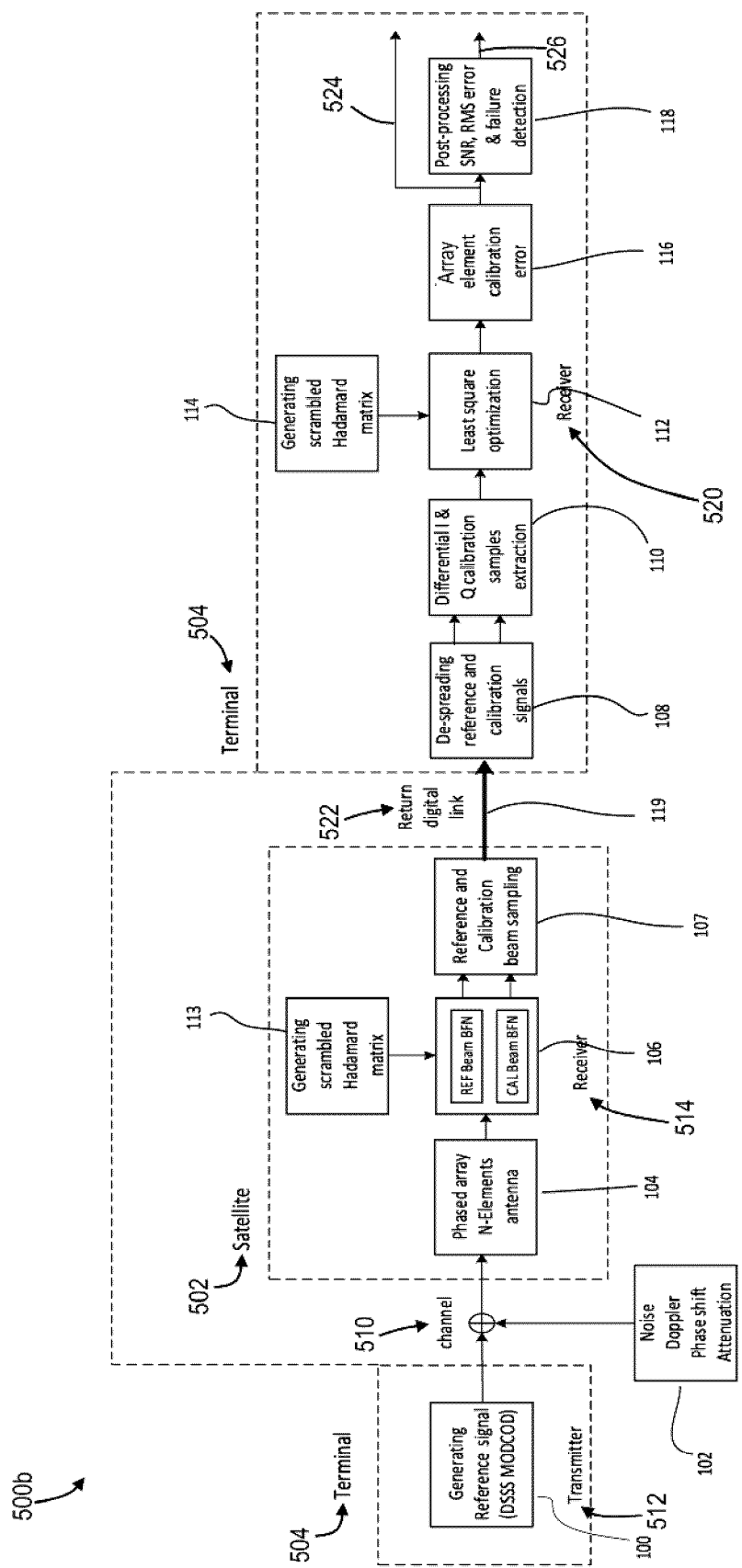
FIG. 5B is a functional block diagram of a calibration method showing the processing involved in the transmission and reception of the receiver phased array antenna calibration, the calibration processing performed at the calibration terminal, according to an embodiment.

Referring now to FIG. 5A, shown therein is a system 500a for calibration signal processing for a receiver (Rx) PAA, according to an embodiment. Calibration processing for the Rx PAA in system 500a is performed on the satellite (as opposed to at the calibration terminal).

The system 500 includes a satellite 502 and a calibration terminal 504.

The satellite 502 includes a receiver 514. The receiver 514 may be a component of or otherwise connected to or in communication with a processing unit of the satellite 502.

The calibration terminal 504 includes a transmitter 512. The transmitter 512 may be a component of or otherwise connected to or in communication with a processing unit of the calibration terminal 504.

The satellite 502 and the calibration terminal 504 may be the satellite 60 and calibration terminal 58 of FIG. 3, respectively.

The transmitter 512 includes a reference signal generator module 100.

The receiver 514 includes a PAA having N array elements 104, a BFN module 106 including a REF beam BFN and a CAL beam BFN, a de-spreading reference and calibration signals module 108, a differential I and Q calibration samples extraction module 110, a least square optimization module 112, a scrambled Hadamard matrix generator module 114 (may in other embodiments be done at terminal), an array element calibration error generator module 116, and a post-processing SNR, RMS, and failure detection module 118.

The system 500 also includes a wireless RF channel 510.

In FIG. 5A, the proposed processing of the receiver phased array antenna calibration is shown. In this direction, the transmitter 512 is simpler. Only a single carrier (reference signal) is generated with a unique spreading code at 100. The UL channel 510 gets affected by similar signal alterations (e.g. noise, Doppler, phase shift, attenuation) but at a different RF frequency at 102.

The phased array antenna under calibration 104 receives a single signal and brings the signal to the BFN combiner 106.

The receiver BFN is modulated with scrambled Hadamard sequences (from scrambled Hadamard matrix generated at 114), which creates the Rx (Receive) calibration signal. The second beam pointed to the calibration terminal 504 has the standard beam steering weights which produces the reference beam.

Similar to the previous process described in FIG. 4, the two signals (reference signal and calibration signal) are de-spreaded at 108. The de-spreaded reference and calibration signals are synchronized and normalized at 110. Matrix processing is performed on the synchronized and normalized reference and calibration signals at 112/114. The calibration error signals are extracted at 116. SNR, overall RMS error, calibration validation and element failure detection is performed and extracted at 118.

In addition to the processing already mentioned, the normal beam shape amplitude taper is removed. The beam steering information (which is provided by the satellite) is used to compute the calibration error matrix (e.g. using the equation, $\vec{c}=(G^H H^H HG)^{-1} G^H H^H \vec{y}$ described above in reference to FIG. 1), Some spreading code repetition is applied to increase coding gain and reduce the calibration error with a higher post-processed SNR. The code repetition is used to increase processing gain (and because of hardware limitations).

The array element calibration error determined at 116 is outputted at 516. The determinations at 118 are outputted at 518. Outputting the information at 516, 518 may be similar to the outputting 89, 91 of FIG. 4. The information outputted at 516, 518 may be provided to a satellite component such as the processor unit (e.g. processor unit 302 of FIG. 3) for removal of the calibration error (e.g. such as in FIG. 4) or to another system.

Referring now to FIG. 5B, shown therein is a system 500b for calibration signal processing for a Rx PAA, according to another embodiment. The system 500b is a variation of system 500a of FIG. 5A and includes the satellite 502 and the calibration terminal 504. In contrast to system 500a which performs calibration processing on the satellite 502, the system 500b is configured to perform calibration processing at the terminal 504. In system 500b, the terminal 504 includes a receiver component 520 in addition to the transmitter component 512.

In system 500b, the satellite 502 (e.g. the receiver PAA BFN controller) includes a scrambled Hadamard matrix generator module 113 and a reference and calibration beam sampling module 107 for digitally sampling the calibration beam and reference beam.

In system 500b, reference and calibration beam sampling is performed at the receiver component 514 of the satellite 502 at 107. The generated samples are then sent to the terminal 504 via a return digital link 522 for processing. The method of the digital transmission is not particularly relevant and agnostic. An analog signal returning via an RF channel cannot be used for this purpose. Once the samples have been received by the terminal 504, the terminal 504 performs de-spreading of reference and calibration signals at 108, differential I and Q calibration samples extraction at 110, LS optimization at 112, scrambled Hadamard matrix generation at 114, array element calibration error determination at 116, and post-processing, SNR, RMS error, and failure detection at 118. The information generated at 116, 118 is outputted at 524 and 526, respectively, which includes sending the information such as calibration error, or subset or derivative thereof, to the satellite 502 or other system for correction. Outputting the information at 516, 518 may be similar to the outputting 89, 91 of FIG. 4.

Figure 6:
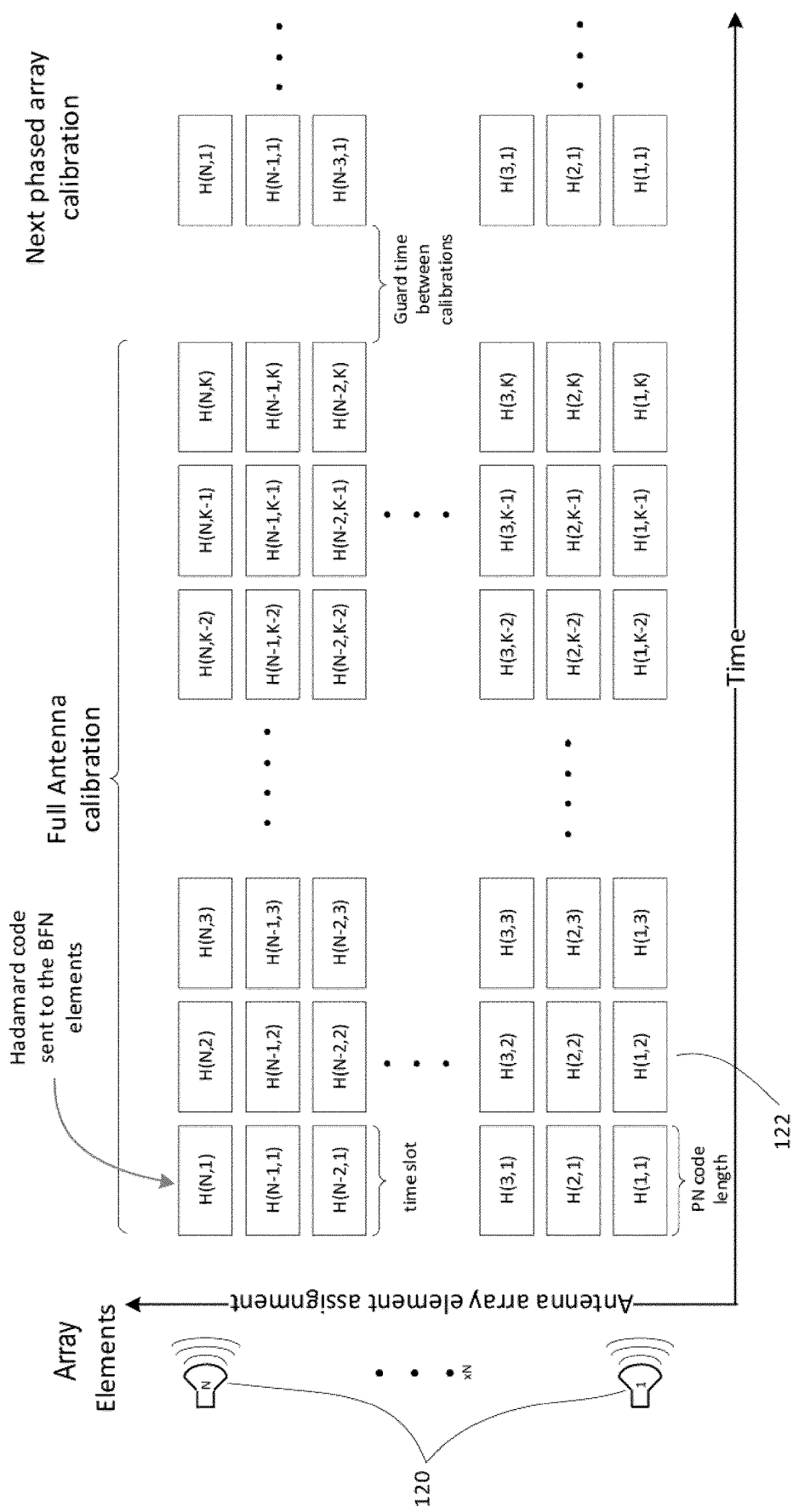
FIG. 6 is a schematic graphical representation of calibration method showing the sequence of sending the Hadamard codes on the BFN while evaluating a transmitter or receiver phased array, according to an embodiment.

Referring now to FIG. 6, shown therein a schematic diagram 600 illustrating the relation between Hadamard codes and array elements 120, according to an embodiment.

In each timeslot 122, a spreading code is sent along with a specific Hadamard sequence at each element. The Hadamard code includes a pseudo noise code length. As mentioned above, more timeslots are used than the number of elements in the antenna. The longer overall frame from this approach brings additional coding gain used to improve SNR.

In a transmit mode, the scrambling of the codes (using the orthogonal codes, in this case Hadamard codes) prevents having high energy peaks pointing in certain directions. The antenna space pattern is somewhat uniform as a noisy beam would be. The implemented power level reduction helps address regulatory compliance and interference mitigation.

In a receive mode, the code scrambling (from the orthogonal codes) helps reduce the potential interference that could increase the overall calibration error.

Referring now to FIG. 7, shown therein is a beam system 700 which may be used by the calibration method of the present disclosure, according to an embodiment. The beam system 700 includes a calibration beam 702 and a reference beam 704.

FIG. 7 illustrates the beam time slot synchronization 122 in relation to the spreading codes and Hadamard BFN sequence, according to an embodiment. A time slot is defined as the reference period of time where the full beam spreading code is sent for a single Hadamard (orthogonal) code. In every time slot the spreading code is repeated by the Hadamard code is changed.

Each of the calibration beam 702 and the reference beam 704 includes a plurality of timeslots 706. Time slots 706 of the calibration beam 702 and time slots 706 of the reference beam 704 are synchronized (e.g. as shown in FIG. 7, a first calibration beam time slot is synchronized with a first reference beam time slot, and a second calibration beam time slot is synchronized with a second reference beam time slot).

The calibration beam 702 includes a BFN component 708 and a calibration signal component 710. The BFN component 708 includes a first beam pointing information multiplied by a Hadamard code (first and second Hadamard codes are shown in FIG. 7). The Hadamard code is sent to the BFN elements and multiplied by the pointing beam. The calibration signal component 710 includes a first spreading code ("G1"). In the present embodiment, the first spreading code is a modulated spreading code. The spreading code is modulated using a modulation scheme, such as binary phase shift keying ("BPSK") (shown).

The reference beam 704 includes a BFN component 712 and a reference signal component 714. The BFN component 712 includes the first beam pointing information. The beam pointing information is for pointing the beam to the calibration terminal (e.g. calibration terminal 58). The BFN component 712 may be a "regular" tracking beam. The reference signal component 714 includes a second spreading code ("G2") that is different from the first spreading code of the calibration signal component 710. The second spreading code is modulated as with the first spreading code.

With the above-described methods and the proper link quality, the average element calibration error of an active antenna could be around 0.2 dB (1 σ) of amplitude error and 2° (1 σ) of phase error. This is part of a complete error budget of the active antenna which leads to controlled degradation of its shape and level. Matlab™ Simulations and real measurements in laboratory were used to demonstrate the calibration method of the present disclosure.

According to an aspect of the present disclosure, there is provided a method of calibrating a phased array antenna ("PAA"). The PAA includes a plurality of array elements. The method includes transmitting, from a processor unit connected to the PAA, a beam steering information (or beam pointing information) of all the plurality of array elements to a calibration terminal. The method further includes simultaneously processing a calibration beam and a reference beam between the calibration terminal and all the plurality of array elements and the processor unit. The calibration beam and the reference beam are modulated and coded using a spreading sequence, such as a direct spread spectrum sequence. The method further includes determining a phase error and an amplitude error for each of the plurality of array elements by removing the beam steering information from all the plurality of array elements from the received calibration and reference beams. The method further includes transmitting the phase error and the amplitude error for each one of the plurality of array elements to the processor connected to the PAA to remove the phase error and the amplitude error from an operating signal of each of the plurality of array elements.

According to another aspect of the present disclosure, there is provided a system for calibrating an active phased array antenna ("PAA"). The PAA includes a plurality of array elements. The system includes a processor unit connected to the PAA and a remote calibration terminal. The remote calibration terminal is linked to all the plurality of array elements of the PAA. The remote calibration terminal is configured to receive a beam steering information (or beam pointing information) of all the plurality of array elements from the processor unit. The remote calibration terminal simultaneously processes a calibration beam and reference beam with all the plurality of array elements and the processor unit. The calibration beam and the reference beam are modulated and coded using a spreading sequence, such as a direct spread spectrum sequence ("DSSS"). The remote calibration terminal is further configured to determine a phase error and an amplitude error for each one of the plurality of array elements by removing the beam steering information of all the plurality of array elements from the received calibration beam and reference beam. The remote terminal is further configured to analyze the received calibration and reference beams. The remote calibration terminal is further configured to transmit the phase error and the amplitude error of each of the plurality of array elements to the processor unit to remove the phase the phase error and the amplitude error from an operating signal of the each of the plurality of array elements. The processor unit removes the phase errors and the amplitude errors from the operating signals.

In an embodiment, a controller of the PAA may retrieve the beam law table ("BLT") of the reference beam in the usual way as any other beam and distribute it to the beam forming integrated circuits ("BFIC") of the PAA. The controller may then retrieve the identified Hadamard (or other orthogonal) vector in the beam law index ("BLI") and the associated reference beam, keep the amplitude of the Hadamard vector and apply the phase inversion of the Hadamard vector to the phase vector of the reference beam (keeping or inverting the phase MSB) and then distributes the results to the BFICs. This sequence may be repeated until all the orthogonal Hadamard vectors are served.

In an embodiment, for a transmit PAA, an onboard processor ("OBP") of the PAA transmits the orthogonal pseudo-random calibration and reference signals and the calibration terminal receives the combined signal, dispreading its components to extract the Hadamard coefficients using timing of the reference component.

In an embodiment, for a receive PAA, the calibration terminal transmits a pseudo-random signal and the OBP samples the calibration and reference beams, encapsulates the samples and routs them to the calibration terminal for dispreading.

In an embodiment, upon completion of the calibration sequence of each beam the calibration terminal computes its calibration correction vector and transmits the results to a satellite resource manager ("SRM"). The SRM then commands the PAA to incrementally apply the calibration update.

Additional applications of the calibration methods of the present disclosure will now be described.

A further application of the present disclosure for performing inter-element coupling measurement will now be described with reference to FIG. 8.

A further application of the present disclosure is proposed including inter-element coupling measurement. The purpose is to measure the coupling between each element with each other.

Figure 8:
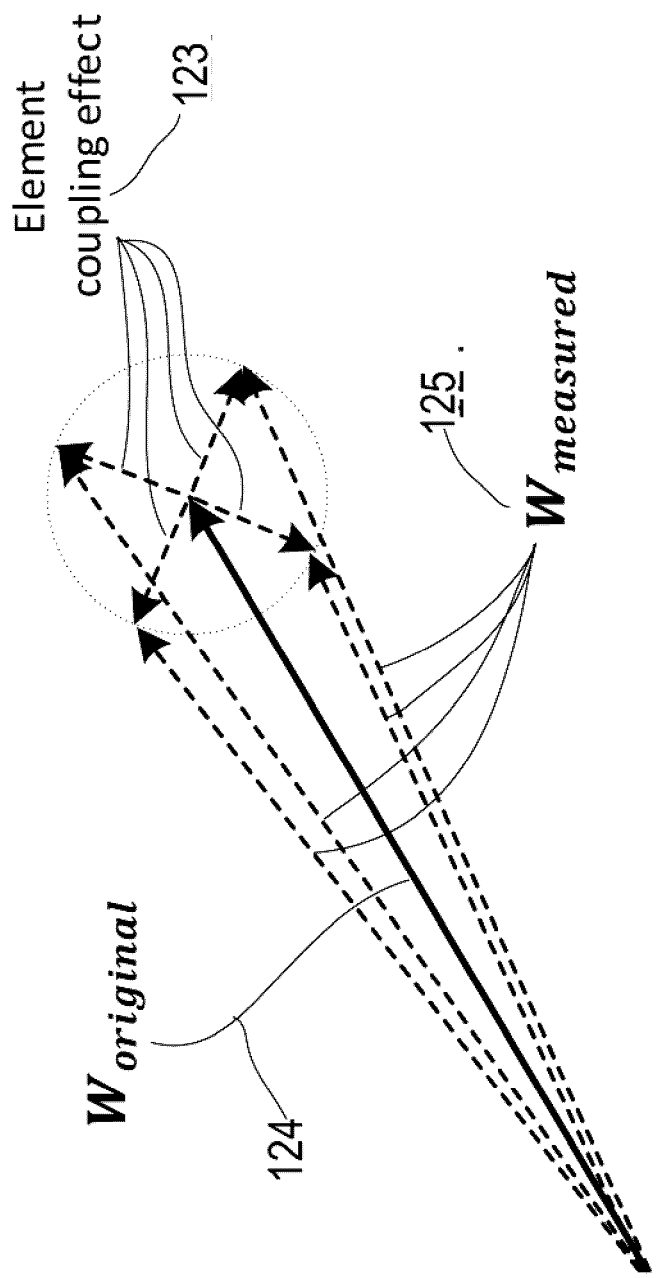
FIG. 8 is a schematic graphical representation of how the inter-element coupling effect is evaluated on a signal element complex weight vector, according to an embodiment.

FIG. 8 illustrates an element coupling effect. In FIG. 8, the source of element coupling effect 123 comes from RF isolation between elements, antenna mutual coupling, and external signal reflections. This information is used to identify problems with the PAA or measuring free space RF multipath. Considering the PAA as having N elements, the resulting complex matrix of N×N data points shows the interdependence of elements. Assuming the weight of one element is 124:

$$W_N = a_N e^{j(\theta_N)}$$

$$k = 0, \frac{\pi}{2}, \pi \text{ and } \frac{3\pi}{2}$$

Changing the phase by on one element four times, we measure the resulting complex vector 125 on all other elements using the calibration technique described above. The measured vector 125 is in the form of:

$$W_N = a_N e^{j(\theta_N)} + b_N e^{j(k\frac{\pi}{2} + \varphi_N)}$$

The amplitude of the coupling is the radius of the circle. The phase can be calculated from the difference between the reference phase and calibration measurements (using the calibration methods described herein). That would fill one row of the N×N coupling matrix. The number of calibrations to run to fill the whole matrix is 4 N times.

A further application of the present disclosure for performing beam pointing estimation will now be described with reference to FIG. 9.

Another application of the present disclosure is the capability to estimate a Beam Pointing Error ("BPE") using the calibration errors of a PAA (which can be determined using the calibration methods described herein). For example, the BPE estimation technique of the present disclosure may use the calibration error matrix determined at 88 of FIG. 4 or at 116 of FIG. 5A or FIG. 5B.

Figure 9:
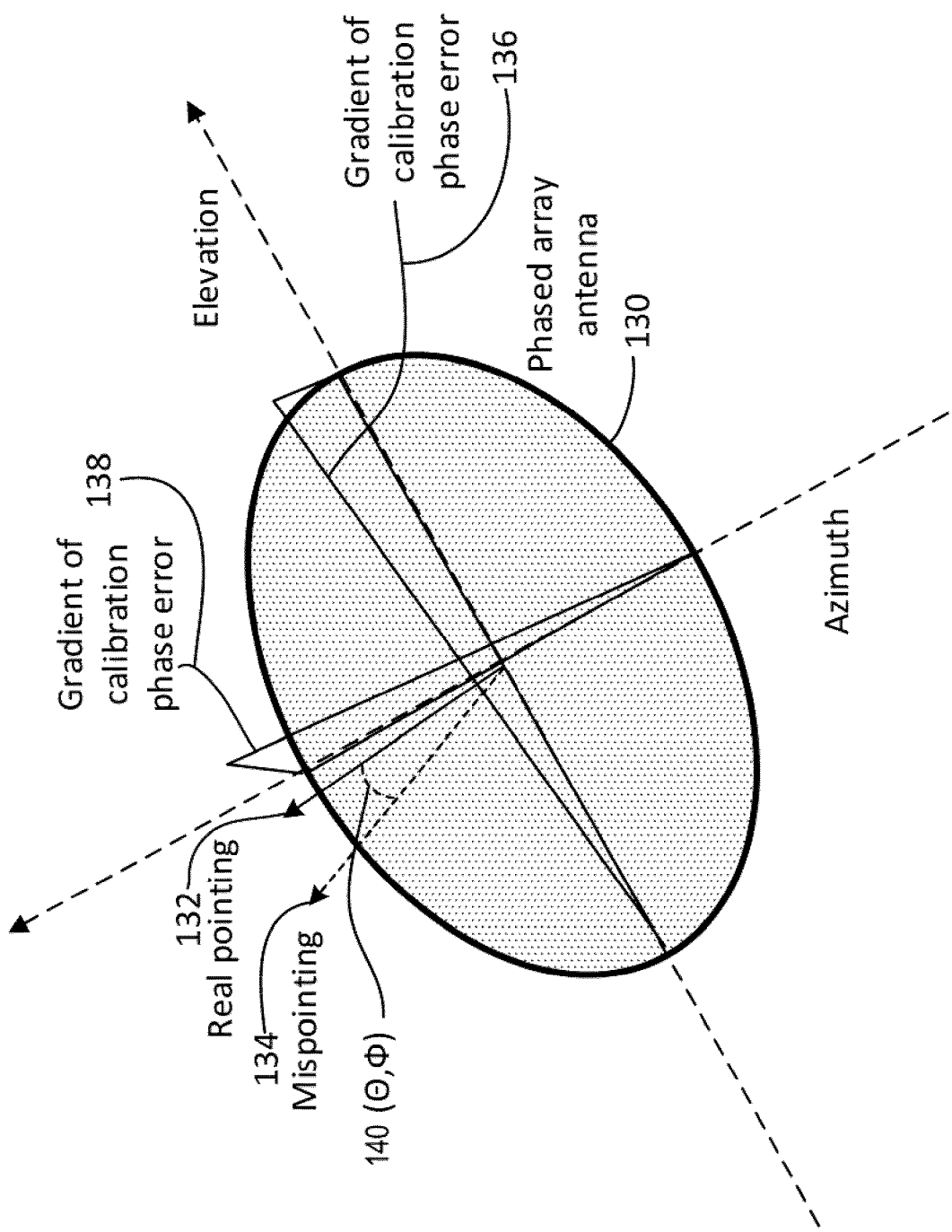
FIG. 9 is a schematic graphical representation of a phased array antenna position with a mis-pointing error that can be evaluated via the calibration particular processing, according to an embodiment.

The BPE estimation technique is illustrated in FIG. 9, according to an embodiment. The BPE determination may be performed by a processor unit which may or may not be located on the satellite (e.g. or other such platform on which the PAA is implemented/mounted). In a particular embodiment, the BPE determination may be performed on the satellite by the processor unit of the satellite. The processor unit may be the satellite's OBP. In other cases, the BPE may be determined by a processor unit (e.g. processor unit 304) that is not located on the satellite, such as on the ground. Where the BPE determination is performed by a processor unit that is not on the satellite, the BPE determinations are outputted by the processor unit and sent to the satellite. The processor unit making the BPE determination may receive information from an attitude subsystem of the spacecraft to be used in determining the BPE. Where the processor unit is remote from the satellite, this would further include the satellite sending such attitude information to the processor unit. In some cases, attitude control subsystem information may be first provided by the attitude control subsystem to an OBP of the satellite and then to the processor (which may be remote from the satellite, such as on ground).

In FIG. 9, a position of a phased array antenna 130 in space is known from a satellite resources manager (e.g. a satellite resource manager module component of the satellite). Nevertheless, a change in satellite attitude can cause a deviation 134 of the pointing beams 132.

A calibration error profile generated from the calibration algorithm of the present disclosure (e.g. the calibration error profiles generated in FIGS. 4, 5) can be processed to assess an azimuth and elevation offset angle of the PAA physical plane including the satellite attitude error. A gradient of phase shift in the two axes 136, 138 is calculated from the error profile and both θ and ϕ angles 140 can be derived. The processor unit of the satellite processes the results of the calibration and can calculate the BPE using the element position.

A system and method to remotely calibrate a phased array antenna of a satellite or terrestrial system is provided herein. The amplitude and phase variations of active antennas used in PAAs are prone to vary over life, temperature, radiation, etc. and need to be corrected frequently to preserve side lobes level and antenna gain. The system utilizes a dedicated calibration terminal on ground capable of performing remote calibration of receivers or transmitters active antennas with N radiating elements. A particular modulation, coding, and level control allows sending a reference and calibration signal using the same antenna. The use of the exact same communications channel removes the variations by its differential decoding. The power level of each transmitter element is coded such that the Equivalent Power-Flux Density (EPFD) on ground is controlled. Multitudes coding methods are used to increase the post detection Signal to Noise Ratio (SNR) and reduce the residual calibration error. Several beams can be calibrated simultaneously which reduces the overall calibration time. The method can be applied to several other applications such as remote element failure detection, inter-element coupling evaluation, spacecraft beam pointing error and antenna manufacturing testing and calibration.

While the above description provides examples of one or more apparatus, methods, or systems, it will be appreciated that other apparatus, methods, or systems may be within the scope of the claims as interpreted by one of skill in the art.

The invention claimed is:

1. A system for calibrating a phased array antenna ("PAA"), the system comprising:
   a PAA having a plurality of array elements, the PAA connected to a processor unit; and
   a remote calibration terminal;
   wherein the PAA includes a reference beamforming network ("BFN") for generating a reference beam and a calibration BFN for generating a calibration beam, and
   wherein the PAA applies a plurality of scrambled orthogonal codes to the calibration BFN to generate the calibration beam;
   wherein the remote calibration terminal is configured to analyze the reference beam and the calibration beam to determine a calibration error for the PAA, the calibration error including a phase error and an amplitude error for each of the plurality of array elements of the PAA.

2. The system of claim 1, wherein the scrambled orthogonal codes are applied to the calibration beam to spatially distribute radiated power and reduce peak radiated power levels.

3. The system of claim 1, wherein the remote calibration terminal is further configured to transmit the calibration error to the PAA for removal from each of the plurality of array elements.

4. The system of claim 1, wherein the plurality of scrambled orthogonal codes are distributed to each of the plurality array elements varying with time.

5. The system of claim 1, wherein the scrambled orthogonal codes are scrambled Hadamard codes.

6. The system of claim 1, wherein the reference beam and the calibration beam are synchronized.

7. The system of claim 1, wherein the reference beam includes a reference signal component and the calibration beam includes a calibration signal component, wherein the reference signal component comprises a first spreading sequence and the calibration signal component comprises a second spreading sequence, the first and second spreading sequences being different.

8. The system of claim 1, wherein the reference beam and the calibration beam are modulated and wherein the reference beam and calibration beam are coded using a direct spread spectrum sequence ("DSSS").

9. The system of claim 1, wherein the reference beam and the calibration beam each comprise a beam pointing information, and wherein for the calibration beam the beam pointing information is mathematically multiplied by the plurality of scrambled orthogonal codes, and wherein the remote calibration terminal is further configured to remove the beam pointing information from the calibration beam to determine the calibration error.

10. The system of claim 1, wherein the remote calibration terminal is configured to perform coherent detection of the reference beam and the calibration beam using the same radio frequency ("RF") channel.

11. The system of claim 1, wherein a single radio frequency ("RF") channel is used for a reference RF channel and a calibration RF channel.

12. The system of claim 1, wherein the PAA is a multiple beam PAA, the PAA and the remote calibration terminal are configured to perform calibration of a plurality of beams of the multiple beam PAA, and the calibration of the plurality of beams is performed simultaneously.

13. The system of claim 1, wherein at least two of the plurality of array elements are active simultaneously during calibration.

14. A method of calibrating a phased array antenna ("PAA"), the method comprising:
   generating a reference beam and a calibration beam at the PAA, the reference beam generated using a reference beamforming network ("BFN") and the calibration beam generated using a calibration BFN, wherein the calibration beam is generated by applying a plurality of scrambled orthogonal codes to the calibration BFN; and analyzing the reference beam and the calibration beam at a remote calibration terminal to determine a calibration error for the PAA, the calibration error including a phase error and an amplitude error for each of the plurality of array element of the PAA.

15. The method of claim 14, wherein the scrambled orthogonal codes are applied to the calibration beam to spatially distribute radiated power and reduce peaks radiated power levels.

16. The method of claim 14, further comprising transmitting calibration error from the remote calibration terminal to the PAA for removal from each of the plurality of array elements and removing the calibration error from the plurality of array elements by a processor unit connected to the PAA.

17. The method of claim 14, wherein applying the plurality of scrambled orthogonal codes to the calibration BFN includes distributing the plurality of scrambled orthogonal codes to each of the plurality array elements varying with time.

18. The method of claim 14, wherein the scrambled orthogonal codes are scrambled Hadamard codes.

19. The method of claim 14, wherein the reference beam includes a reference signal component and the calibration beam includes a calibration signal component, wherein the reference signal component comprises a first spreading sequence and the calibration signal component comprises a second spreading sequence, the first and second spreading sequences being different.

20. The method of claim 14, wherein the reference beam and the calibration beam are modulated and wherein the reference beam and the calibration beam are coded using a direct spread spectrum sequence ("DSSS").

21. The method of claim 14, wherein the reference beam and the calibration beam each comprise a beam pointing information, and wherein generating the calibration beam includes multiplying the beam pointing information by the plurality of scrambled orthogonal codes, and wherein determining the calibration error includes removing the beam pointing information from the calibration beam.

22. The method of claim 14, wherein a single radio frequency ("RF") channel is used for a reference RF channel and a calibration RF channel.

23. The method of claim 14, wherein the PAA is a multiple beam PAA, the method is performed for each of a plurality of beams of the multiple beam PAA, and the method is performed for each of the plurality of beams simultaneously.

24. A method of evaluating inter-element coupling of the PAA comprising modulating a phase of one array element using a $\pi/2$ weight modulation and resolving with the method of claim 14.

25. The method of claim 14, further comprising determining a beam pointing error ("BPE") of the PAA using the calibration error.

26. The method of claim 25, wherein the BPE includes a $\theta$ angle and a $\phi$ angle, and wherein determining the BPE includes determining a first gradient of phase shift in a first axis and a second gradient of phase shift in a second axis and determining the $\theta$ and $\phi$ angles from the first and second gradients of phase shift.

27. The method of claim 25, wherein determining the BPE includes comparing two plane gradients of post-calibration to reference beam pointing at pre-calibration to resolve a beam pointing angel offset.

28. A system for calibrating a phased array antenna ("PAA") having a plurality of array elements, the system comprising:
 a processor unit connected to the PAA; and
 a remote calibration terminal linked to all the plurality of array elements of the PAA,
 wherein the remote calibration terminal:
  receives a beam steering information of all the plurality of array elements of the PAA from the processor unit;
  processes a calibration and reference beam with all the plurality of array elements and the processor unit, the calibration and reference beam modulated and coded using a direct spread spectrum sequence ("DSSS"); and
  determines a phase error and an amplitude error for each one of the plurality of array elements by removing beam steering information of all the plurality of array elements from the received calibration and reference beam and analyzing the received calibration and reference beam.

* * * * *